US008449381B2

(12) United States Patent
Fujimoto et al.

(10) Patent No.: US 8,449,381 B2
(45) Date of Patent: May 28, 2013

(54) GAMING MACHINE HAVING PAYOUT FOR INSURANCE AND CONTROL METHOD THEREOF

(75) Inventors: Jun Fujimoto, Tokyo (JP); Yukinori Inamura, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1180 days.

(21) Appl. No.: 11/951,061

(22) Filed: Dec. 5, 2007

(65) Prior Publication Data

US 2008/0254870 A1 Oct. 16, 2008

Related U.S. Application Data

(60) Provisional application No. 60/907,675, filed on Apr. 13, 2007.

(51) Int. Cl.
*A63F 13/00* (2006.01)

(52) U.S. Cl.
USPC .................. 463/25; 463/16; 463/17; 463/18; 463/19; 463/20

(58) Field of Classification Search
USPC .......................................................... 463/25
See application file for complete search history.

(56) References Cited

U.S. PATENT DOCUMENTS 4,283,709 A 8/1981 Lucero et al.
4,624,459 A 11/1986 Kaufman
4,669,731 A * 6/1987 Clarke ............................ 463/20
4,837,728 A 6/1989 Barrie et al.
4,964,638 A 10/1990 Ishida
5,178,390 A 1/1993 Okada
5,280,909 A 1/1994 Tracy
5,564,700 A 10/1996 Celona
5,611,730 A 3/1997 Weiss
5,639,088 A 6/1997 Schneider et al.
5,695,402 A 12/1997 Stupak
5,702,303 A 12/1997 Takemoto et al.
5,770,533 A 6/1998 Franchi
5,820,459 A 10/1998 Acres et al.
5,836,817 A 11/1998 Acres et al.
5,890,963 A 4/1999 Yen
5,910,048 A 6/1999 Feinberg
6,001,016 A 12/1999 Walker et al.
6,003,013 A 12/1999 Boushy et al.
6,089,980 A 7/2000 Gauselmann
6,224,482 B1 5/2001 Bennett
6,234,896 B1 5/2001 Walker et al.
6,244,957 B1 6/2001 Walker et al.

(Continued)

FOREIGN PATENT DOCUMENTS

DE 3242890 5/1984
DE 3712841 11/1988

(Continued)

OTHER PUBLICATIONS

Macau Office Action and Search Report, English translation included, dated Oct. 22, 2009.

*Primary Examiner* — Ronald Laneau
*Assistant Examiner* — Justin Myhr
(74) *Attorney, Agent, or Firm* — Lexyoume IP Meister, PLLC.

(57) ABSTRACT

A slot machine executes rescue pay when a value Ta of a unit game counter reaches Ta max.

10 Claims, 23 Drawing Sheets

U.S. PATENT DOCUMENTS

| | | | | |
|---|---|---|---|---|
| 6,254,483 | B1 | 7/2001 | Acres | |
| 6,257,981 | B1 | 7/2001 | Acres et al. | |
| 6,270,409 | B1 | 8/2001 | Shuster | |
| 6,273,820 | B1 | 8/2001 | Haste, III | |
| 6,375,567 | B1 | 4/2002 | Acres | |
| 6,695,697 | B1 | 2/2004 | Okada | |
| 6,932,704 | B2 | 8/2005 | Walker et al. | |
| 6,932,707 | B2 | 8/2005 | Duhamel | |
| 7,887,410 | B2 * | 2/2011 | Okada | 463/20 |
| 2003/0069073 | A1 | 4/2003 | Okada | |
| 2003/0087685 | A1 * | 5/2003 | Hogan et al. | 463/13 |
| 2006/0030403 | A1 * | 2/2006 | Lafky et al. | 463/27 |
| 2006/0205495 | A1 | 9/2006 | Fujimoto | |
| 2006/0211485 | A1 | 9/2006 | Fujimoto | |

FOREIGN PATENT DOCUMENTS

| | | | |
|---|---|---|---|
| DE | 4137010 | | 8/1992 |
| DE | 10049444 | | 11/2001 |
| EP | 0 631 798 | A1 | 1/1995 |
| EP | 0 840 264 | A1 | 5/1998 |
| EP | 1 192 975 | A1 | 4/2002 |
| EP | 1 302 914 | A2 | 4/2003 |
| EP | 1 351 180 | A2 | 10/2003 |
| EP | 1 477 947 | A2 | 11/2004 |
| EP | 1 544 811 | A2 | 6/2005 |
| GB | 2 326 830 | A | 1/1999 |
| WO | WO03/083795 | A1 | 10/2003 |
| WO | WO2004/095383 | A1 | 11/2004 |

* cited by examiner

PAYOUT TABLE

| ALL PAYS ON PAYLINE | 1ST Credit | 2ND Credit | 3RD Credit |
|---|---|---|---|
|  DOUBLE DOUBLE DOUBLE | 800 | 1600 | 2400 |
| BAR BAR BAR BAR BAR BAR BAR BAR BAR | 60 | 120 | 180 |
| BAR BAR BAR BAR BAR BAR | 30 | 60 | 90 |
|  | 20 | 40 | 60 |
| BAR BAR BAR | 15 | 30 | 45 |
| ANY ANY ANY BAR BAR BAR | 5 | 10 | 15 |
| ANY 2  | 5 | 10 | 15 |
| ANY 1  | 2 | 4 | 6 |

GAMING MACHINE HAVING PAYOUT FOR INSURANCE AND CONTROL METHOD THEREOF

CROSS REFERENCE TO RELATED APPLICATIONS

This application claims priority to U.S. provisional patent application Ser. No. 60/907,675 filed on Apr. 13, 2007, and which is incorporated by reference herein for all purposes.

BACKGROUND OF THE INVENTION

1. Field of the Invention

The present invention relates to a gaming machine that plays a game by using bet such as a coin, and to a control method of the gaming machine.

2. Description of the Related Art

In a facility in which a gaming machine (refer to Patent Documents 1 to 44) such as a slot machine is placed, a player bets bet such as a coin and a bill on the gaming machine, and thereby can play a game provided by the gaming machine concerned.

For example, every time when the player bets the bet on the slot machine, and presses a start switch, the slot machine executes a unit game in which a plurality of symbols arranged on a display are rearranged. Then, when a combination of the symbols rearranged on the display becomes a predetermined combination, the slot machine provides a payout corresponding to the combination concerned.

The slot machine also performs payout called jackpot. Specifically, the slot machine reserves, as bet for the jackpot, a part of the bet bet on the slot machine. Then, at predetermined timing, the slot machine decides whether or not to provide a payout for the jackpot, and provides a payout of the bet reserved for the jackpot in the case of deciding to provide a payout.

Patent Document 1: U.S. Pat. No. 5,820,459

Patent Document 2: U.S. Pat. No. 6,695,697

Patent Document 3: U.S. Application Laid-Open No. 2003/0069073

Patent Document 4: European Patent Application Laid-Open No. 1192975

Patent Document 5: U.S. Pat. No. 6,254,483

Patent Document 6: U.S. Pat. No. 5,611,730

Patent Document 7: U.S. Pat. No. 5,639,088

Patent Document 8: U.S. Pat. No. 6,257,981

Patent Document 9: U.S. Pat. No. 6,234,896

Patent Document 10: U.S. Pat. No. 6,001,016

Patent Document 11: U.S. Pat. No. 6,273,820

Patent Document 12: U.S. Pat. No. 6,224,482

Patent Document 13: U.S. Pat. No. 4,669,731

Patent Document 14: U.S. Pat. No. 6,244,957

Patent Document 15: U.S. Pat. No. 5,910,048

Patent Document 16: U.S. Pat. No. 5,695,402

Patent Document 17: U.S. Pat. No. 6,003,013

Patent Document 18: U.S. Pat. No. 4,283,709

Patent Document 19: European Patent Application Laid-Open No. 0631798

Patent Document 20: German Patent Application Laid-Open No. 4137010

Patent Document 21: United Kingdom Patent Application Laid-Open No. 2326830

Patent Document 22: German Patent Application Laid-Open No. 3712841

Patent Document 23: U.S. Pat. No. 4,964,638

Patent Document 24: U.S. Pat. No. 6,089,980

Patent Document 25: U.S. Pat. No. 5,280,909

Patent Document 26: U.S. Pat. No. 5,702,303

Patent Document 27: U.S. Pat. No. 6,270,409

Patent Document 28: U.S. Pat. No. 5,770,533

Patent Document 29: U.S. Pat. No. 5,836,817

Patent Document 30: U.S. Pat. No. 6,932,704

Patent Document 31: U.S. Pat. No. 6,932,707

Patent Document 32: U.S. Pat. No. 4,837,728

Patent Document 33: European Patent Application Laid-Open No. 1302914

Patent Document 34: U.S. Pat. No. 4,624,459

Patent Document 35: U.S. Pat. No. 5,564,700

Patent Document 36: International Application Laid-Open No. WO03/083795

Patent Document 37: German Patent Application Laid-Open No. 3242890

Patent Document 38: European Patent Application Laid-Open No. 0840264

Patent Document 39: German Patent Application Laid-Open No. 10049444

Patent Document 40: International Application Laid-Open No. WO04/095383

Patent Document 41: European Patent Application Laid-Open No. 1544811

Patent Document 42: U.S. Pat. No. 5,890,963

Patent Document 43: European Patent Application Laid-Open No. 1477947

Patent Document 44: European Patent Application Laid-Open No. 1351180

SUMMARY OF THE INVENTION

A gaming machine according to a first aspect of the present invention, comprising: a bet switch capable of making bets of a plurality of patterns in which bet amounts are different per unit game; a display adapted to display a result of the game; and a controller configured to: (a) repeatedly execute, through a betting process, the unit game that is started under a condition where the bet switch is operated to make one of the bets of the plurality of patterns, and is ended by displaying the result of the game on the display; (b) store an execution number of maximum-bet unit games in each of which a bet with a maximum bet amount among the bets of the plurality of patterns is made; (c) determine whether or not the stored execution number has reached a predetermined number; and (d) when it is determined that the stored execution number has reached the predetermined number, add a fixed amount of payout to a bet memory, or provide a fixed amount of payout.

A gaming machine according to a second aspect of the present invention, comprising: a bet switch capable of making bets of a plurality of patterns in which bet amounts are different per unit game; a display adapted to display a result of the game; and a controller configured to: (a) repeatedly execute, through a betting process, the unit game that is started under a condition where the bet switch is operated to make one of the bets of the plurality of patterns, and is ended by displaying the result of the game on the display; (b) store an execution number of maximum-bet unit games in each of which a bet with a maximum bet amount among the bets of the plurality of patterns is made; (c) when the bet with the maximum bet amount is made, reserve, as reserved bet, a part of the bet with the maximum bet amount; (d) determine whether or not the stored execution number has reached a predetermined number; and (e) when it is determined that the stored execution number has reached the predetermined number, add a fixed amount of payout from the reserved bet to a bet memory, or provide a fixed amount of payout from the reserved bet.

A gaming machine according to a third aspect of the present invention, comprising: a bet switch capable of making bets of a plurality of patterns in which bet amounts are different per unit game; a display adapted to display a result of the game; a payout port through which payout is provided; and a controller configured to: (a) repeatedly execute, through a betting process, the unit game that is started under a condition where the bet switch is operated to make one of the bets of the plurality of patterns, and is ended by displaying the result of the game on the display; (b) store an execution number of maximum-bet unit games in each of which a bet with the maximum bet amount among the bets of the plurality of patterns is made; (c) determine whether or not the stored execution number has reached a predetermined number; and (d) when it is determined that the stored execution number has reached the predetermined number, provide a fixed amount of payout through the payout port.

A gaming machine according to a fourth aspect of the present invention, comprising: a bet switch capable of making bets of a plurality of patterns in which bet amounts are different per unit game; a display adapted to display a result of the game; a payout port through which payout is provided; and a controller configured to: (a) repeatedly execute, through a betting process, the unit game that is started under a condition where the bet switch is operated to make one of the bets of the plurality of patterns, and is ended by displaying the result of the game on the display; (b) store an execution number of maximum-bet unit games in each of which a bet with a maximum bet amount among the bets of the plurality of patterns is made; (c) when the bet with the maximum bet amount is made, reserve, as reserved bet, a part of the bet with the maximum bet amount; (d) determine whether or not the stored execution number has reached a predetermined number; and (e) when it is determined that the stored execution number has reached the predetermined number, provide a fixed amount of payout from the reserved bet through the payout port.

A gaming machine according to a fifth aspect of the present invention, comprising: a bet switch capable of making bets of a plurality of patterns in which bet amounts are different per unit game; a display adapted to arrange and rearrange a plurality of symbols; and a controller configured to: (a) repeatedly execute, through a betting process, the unit game that is started under a condition where the switch is operated to make one of the bets of the plurality of patterns, and is ended by rearranging the plurality of symbols arranged on the display; (b) store an execution number of maximum-bet unit games in each of which a bet with a maximum bet amount among the bets of the plurality of patterns is made; (c) determine whether or not the stored execution number has reached a predetermined number; and (d) when it is determined that the stored execution number has reached the predetermined number, add a fixed amount of payout to a bet memory, or pay out a fixed amount of payout.

A gaming machine according to a sixth aspect of the present invention, comprising: a bet switch capable of making bets of a plurality of patterns in which bet amounts are different per unit game; a display adapted to arrange and rearrange a plurality of symbols; and a controller configured to: (a) repeatedly execute, through a betting process, the unit game that is started under a condition where the switch is operated to make one of the bets of the plurality of patterns, and is ended by rearranging the plurality of symbols arranged on the display; (b) store an execution number of maximum-bet unit games in each of which a bet with a maximum bet amount among the bets of the plurality of patterns is made; (c) when the bet with the maximum bet amount is made, reserve, as reserved bet, a part of the bet with the maximum bet amount; (d) determine whether or not the stored execution number has reached a predetermined number; and (e) when it is determined that the stored execution number has reached the predetermined number, add a fixed amount of payout from the reserved bet to a bet memory, or provide a fixed amount of payout from the reserved bet.

A gaming machine according to a seventh aspect of the present invention, comprising: a bet switch capable of making bets of a plurality of patterns in which bet amounts are different per unit game; a display adapted to arrange and rearrange a plurality of symbols; a payout port through which payout is provided; and a controller configured to: (a) repeatedly execute, through a betting process, the unit game that is started under a condition where the switch is operated to make one of the bets of the plurality of patterns, and is ended by rearranging the plurality of symbols arranged on the display; (b) store an execution number of maximum-bet unit games in each of which a bet with a maximum bet amount among the bets of the plurality of patterns is made; (c) determine whether or not the stored execution number has reached a predetermined number; and (d) when it is determined that the stored execution number has reached the predetermined number, provide a fixed amount of payout through the payout port.

A gaming machine according to an eighth aspect of the present invention, comprising: a bet switch capable of making bets of a plurality of patterns in which bet amounts are different per unit game; a display adapted to arrange and rearrange a plurality of symbols; a payout port through which payout is provided; and a controller configured to: (a) repeatedly execute, through a betting process, the unit game that is started under a condition where the switch is operated to make one of the bets of the plurality of patterns, and is ended by rearranging the plurality of symbols arranged on the display; (b) store an execution number of maximum-bet unit games in each of which a bet with a maximum bet amount among the bets of the plurality of patterns is made; (c) when the bet with the maximum bet amount is made, reserve, as reserved bet, a part of the bet with the maximum bet amount; (d) determine whether or not the stored execution number has reached a predetermined number; and (e) when it is determined that the stored execution number has reached the predetermined number, provided a fixed amount of payout from the reserved bet through the payout port.

A control method of a gaming machine according to a ninth aspect of the present invention, comprising: repeatedly executing a unit game that is started under a condition where a bet switch capable of making bets of a plurality of patterns in which bet amounts are different per unit game is operated to make one of the bets of the plurality of patterns, and is ended by displaying a result of the game on the display, through a betting process; storing an execution number of maximum-bet unit games in each of which a bet with a maximum bet amount among the bets of the plurality of patterns is made; determining whether or not the stored execution number has reached a predetermined number; and when it is determined that the stored execution number has reached the predetermined number, adding a fixed amount of payout to a bet memory, or providing a fixed amount of payout.

A control method of a gaming machine according to a tenth aspect of the present invention, comprising: repeatedly executing a unit game that is started under a condition where a bet switch capable of making bets of a plurality of patterns in which bet amounts are different per unit game is operated to make one of the bets of the plurality of patterns, and is ended by displaying a result of the game on the display, through a betting process; storing an execution number of maximum-bet unit games in each of which a bet with a maximum bet amount among the bets of the plurality of patterns is made; when the bet with the maximum bet amount is made, reserving, as reserved bet, a part of the bet with the maximum bet amount; determining whether or not the stored execution number has reached a predetermined number; and when it is determined that the stored execution number has reached the predetermined number, adding a fixed amount of payout among the reserved bet to a bet memory, or providing a fixed amount of payout.

A control method of a gaming machine according to an eleventh aspect of the present invention, comprising: repeatedly executing a unit game that is started under a condition where a bet switch capable of making bets of a plurality of patterns in which bet amounts are different per unit game is operated to make one of the bets of the plurality of patterns, and is ended by displaying a result of the game on the display, through a betting process; storing an execution number of maximum-bet unit games in each of which a bet with a maximum bet amount among the bets of the plurality of patterns is made; determining whether or not the stored execution number has reached a predetermined number; and when it is determined that the stored execution number has reached the predetermined number, providing a fixed amount of payout through a payout port.

A control method of a gaming machine according to a twelfth aspect of the present invention, comprising: repeatedly executing a unit game that is started under a condition where a bet switch capable of making bets of a plurality of patterns in which bet amounts are different per unit game, is operated to make one of the bets of the plurality of patterns, and is ended by displaying a result of the game on the display, through a betting process; storing an execution number of maximum-bet unit games in each of which a bet with a maximum bet amount among the bets of the plurality of patterns is made; when the bet with the maximum bet amount is made, reserving, as reserved bet, a part of the bet with the maximum bet amount; determining whether or not the stored execution number has reached a predetermined number; and when it is determined that the stored execution number has reached the predetermined number, providing a fixed amount of payout from the reserved bet through a payout port.

A control method of a gaming machine according to a thirteenth aspect of the present invention, comprising: repeatedly executing a unit game that is started under a condition where a bet switch capable of making bets of a plurality of patterns in which bet amounts are different per unit game is operated to make one of the bets of the plurality of patterns, and is ended by rearranging a plurality of symbols arranged on a display, through a betting process; storing an execution number of maximum-bet unit games in each of which a bet with a maximum bet amount among the bets of the plurality of patterns is made; determining whether or not the stored execution number has reached a predetermined number; and when it is determined that the stored execution number has reached the predetermined number, adding a fixed amount of payout to a bet memory, or providing a fixed amount of payout.

A control method of a gaming machine according to a fourteenth aspect of the present invention, comprising: repeatedly executing a unit game that is started under a condition where a bet switch capable of making bets of a plurality of patterns in which bet amounts are different per unit game is operated to make one of the bets of the plurality of patterns, and is ended by rearranging a plurality of symbols arranged on a display, through a betting process; storing an execution number of maximum-bet unit games in each of which a bet with a maximum bet amount among the bets of the plurality of patterns is made; when the bet with the maximum bet amount is made, reserving, as reserved bet, a part of the bet with the maximum bet amount; determining whether or not the stored execution number has reached a predetermined number; and when it is determined that the stored execution number has reached the predetermined number, adding a fixed amount of payout from the reserved bet to a bet memory, or providing a fixed amount of payout.

A control method of a gaming machine according to a fifteenth aspect of the present invention, comprising: repeatedly executing a unit game that is started under a condition where a bet switch capable of making bets of a plurality of patterns in which bet amounts are different per unit game is operated to make one of the bets of the plurality of patterns, and is ended by rearranging a plurality of symbols arranged on a display, through a betting process; storing an execution number of maximum-bet unit games in each of which a bet with a maximum bet amount among the bets of the plurality of patterns is made; determining whether or not the stored execution number has reached a predetermined number; and when it is determined that the stored execution number has reached the predetermined number, providing a fixed amount of payout through a payout port.

A control method of a gaming machine according to a sixteenth aspect of the present invention, comprising: repeatedly executing a unit game that is started under a condition where a bet switch capable of making bets of a plurality of patterns in which bet amounts are different per unit game is operated to make one of the bets of the plurality of patterns, and is ended by rearranging a plurality of symbols arranged on a display, through a betting process; storing an execution number of maximum-bet unit games in each of which a bet with a maximum bet amount among the bets of the plurality of patterns is made; when the bet with the maximum bet amount is made, reserving, as reserved bet, a part of the bet with the maximum bet amount; determining whether or not the stored execution number has reached a predetermined number; and when it is determined that the stored execution number has reached the predetermined number, providing a fixed amount of payout from the reserved bet through a payout port.

DETAILED DESCRIPTION OF THE EMBODIMENTS (First Embodiment)

Figure 1:
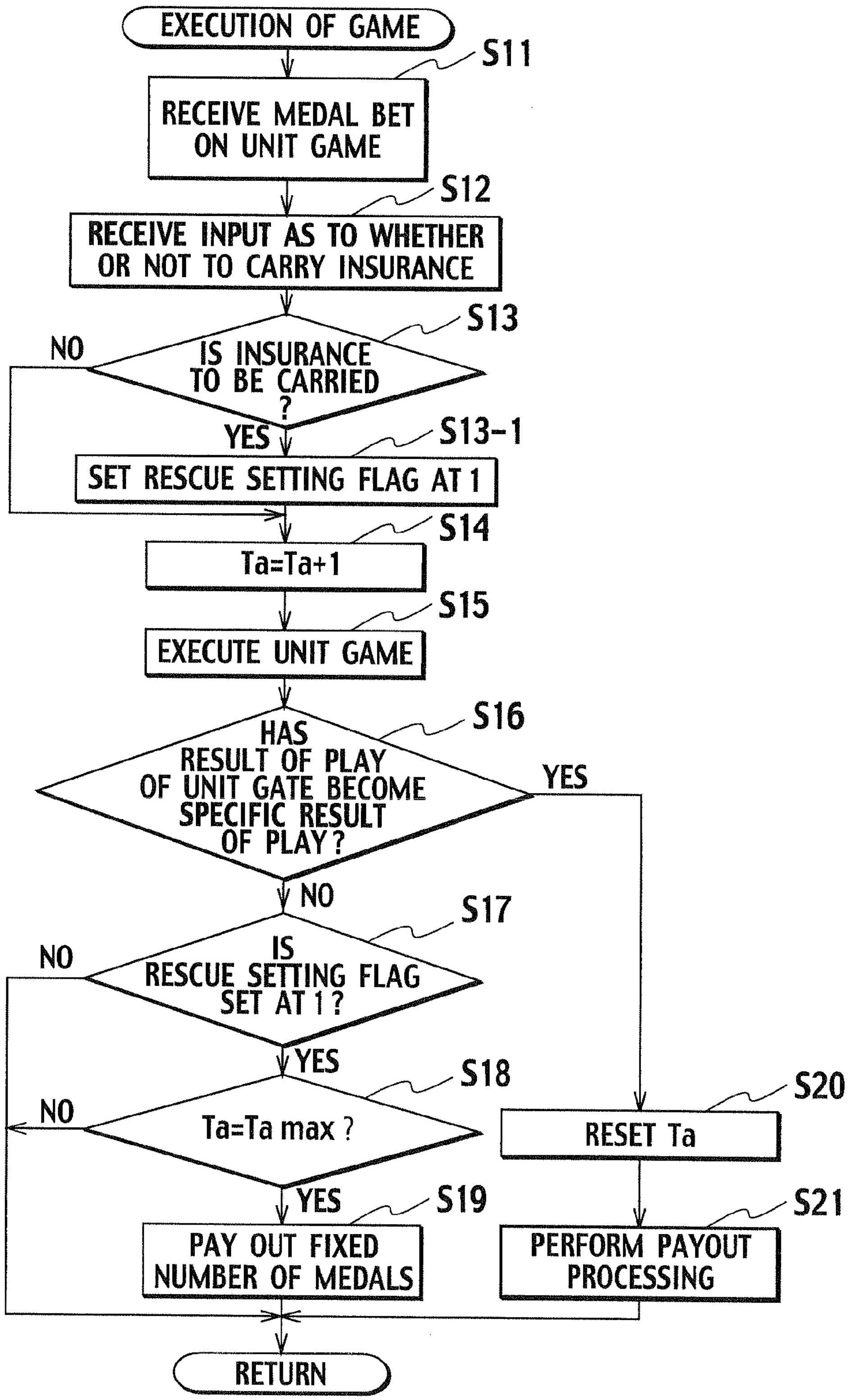
FIG. 1 is a flowchart showing an example of processing performed by a slot machine according to an embodiment of the present invention.
Figure 2:
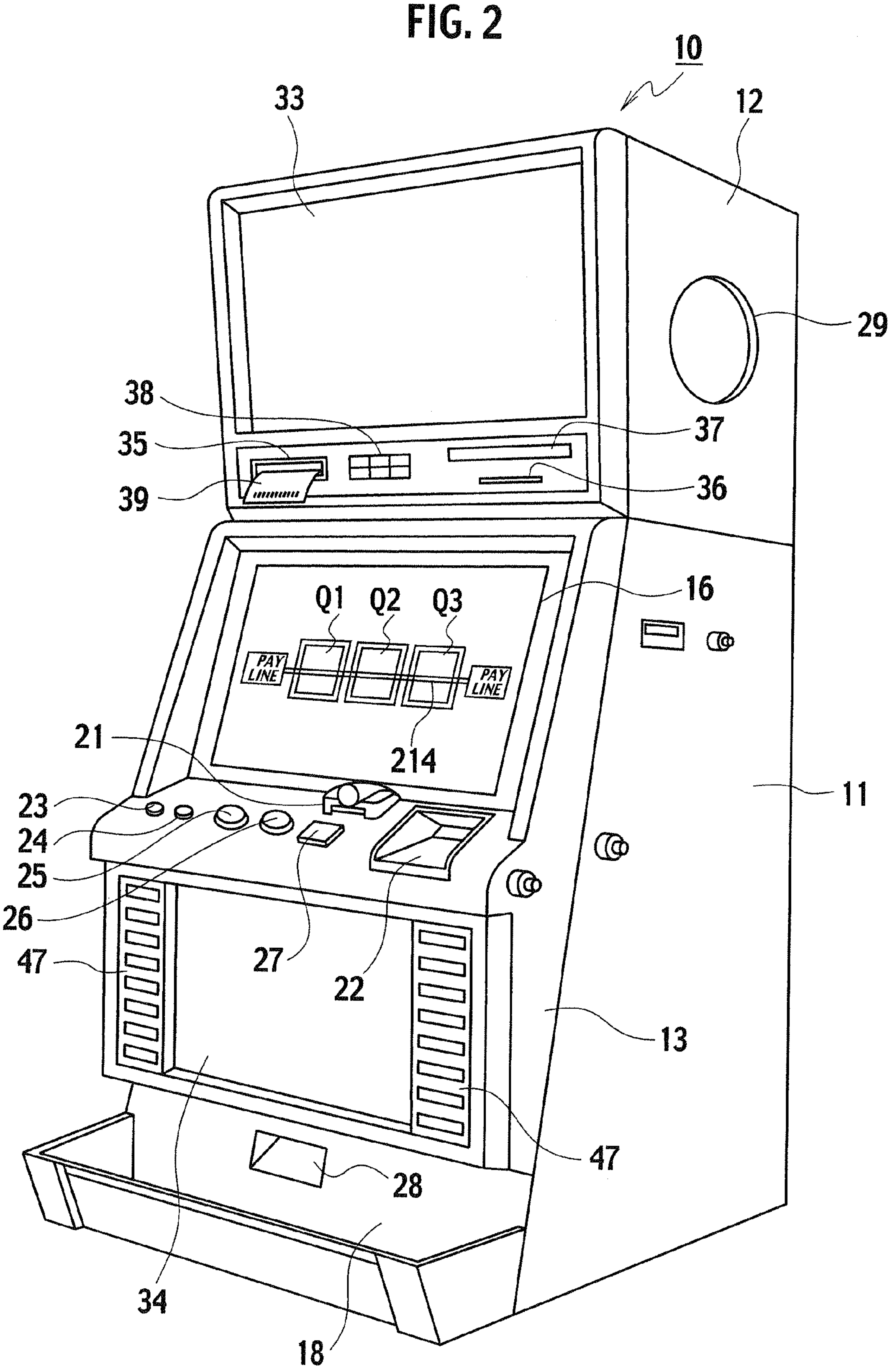
FIG. 2 is a perspective view of the slot machine according to the embodiment of the present invention.
Figure 18A:
FIG. 18A is an explanatory view showing an example of an image displayed by the slot machine according to the embodiment of the present invention.
Figure 18B:
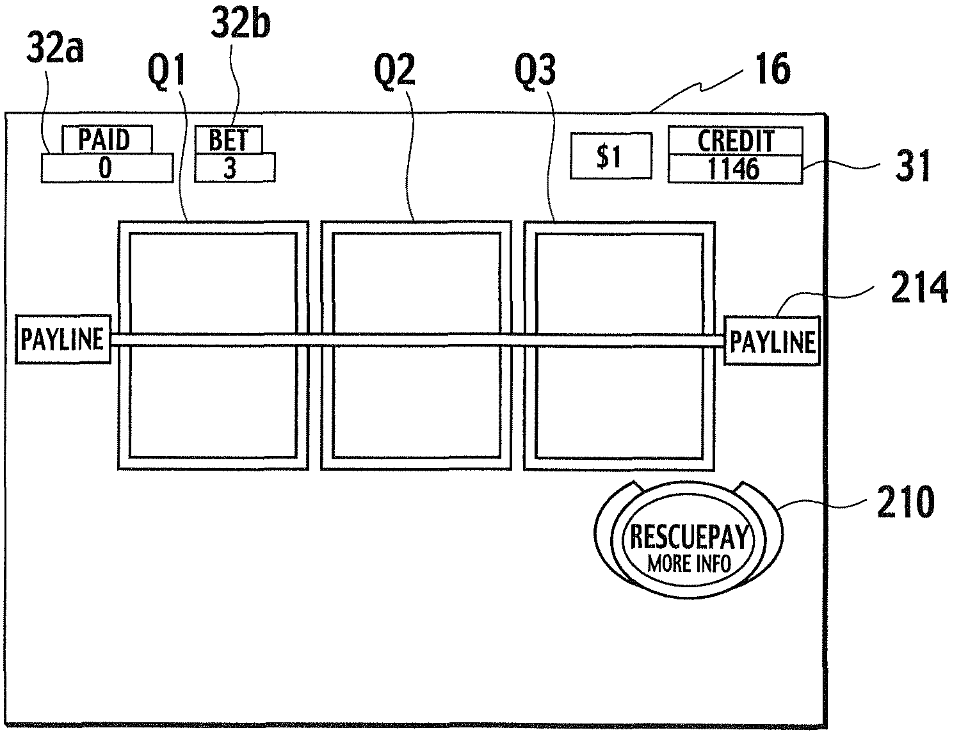
FIG. 18B is an explanatory view showing an example of an image displayed by the slot machine according to the embodiment of the present invention.
Figure 19:
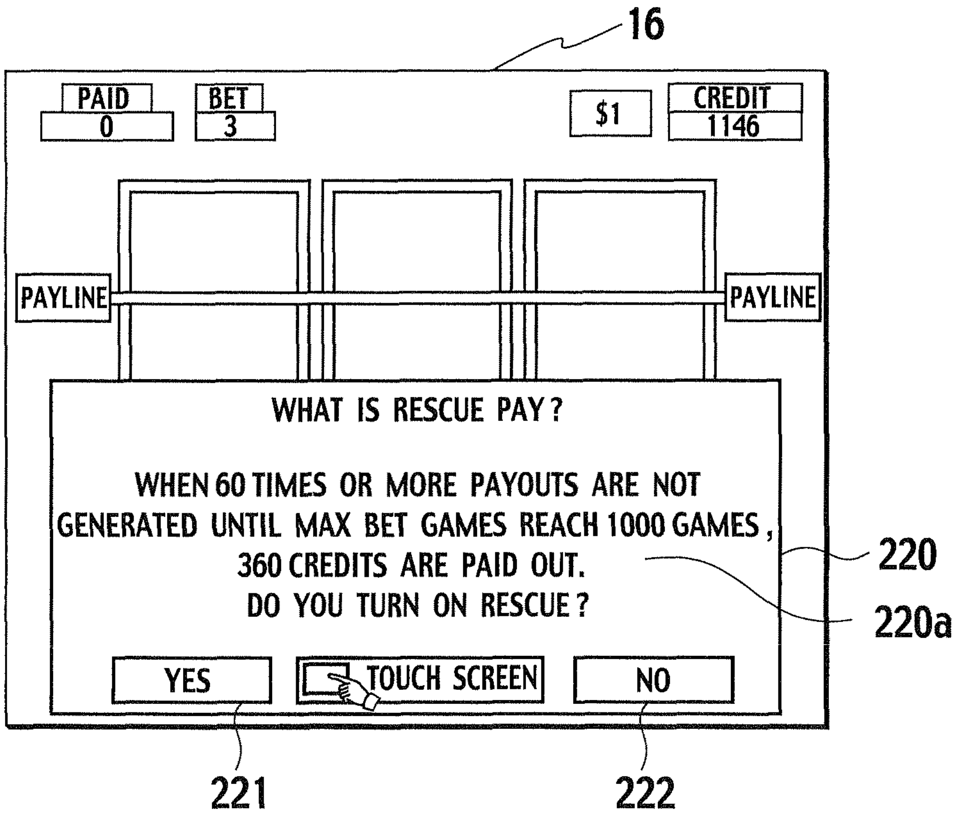
FIG. 19 is an explanatory view showing an example of an image displayed by the slot machine according to the embodiment of the present invention.

A description will be made of characteristic portions of a first embodiment of the present invention with reference to a flowchart shown in FIG. 1, a perspective view of a slot machine 10, which is shown in FIG. 2, and explanatory views shown in FIG. 18B and FIG. 19. FIG. 18B and FIG. 19 are explanatory views showing images displayed on a liquid crystal display 16 (display) of the slot machine 10.

The slot machine 10 according to the first embodiment performs execution processing of a game, which is shown in FIG. 1. Specifically, in Step S11, the slot machine 10 receives a medal (bet) bet for a unit game. The medal is also referred to as a credit. In the first embodiment and the respective embodiments to be described below, the bet is a concept including a monetary value (valuable information) paid out from the slot machine 10 as well as a monetary value (valuable information) inserted by a player into the slot machine 10. Here, the unit game is started by starting to scroll symbols stopped (arranged) on display areas Q1 to Q3, and is ended by stopping (rearranging) the symbols on the display areas Q1 to Q3 one more time. One symbol is stopped on each of the display areas Q1 to Q3.

In Step S12, the slot machine 10 receives an input as to whether or not to carry insurance (that is, to turn on rescue pay).

Specifically, a rescue pay button 210 shown in FIG. 18B is displayed on the liquid crystal display 16. The rescue pay is also referred to as insurance pay. A surface of the liquid crystal display 16 is covered with a touch panel sensor 19. The slot machine 10 determines whether or not the player has pressed the rescue pay button 210 based on a signal given from the touch panel sensor 19. In the case of determining that the player has pressed the rescue pay button 210, the slot machine 10 displays an explanation panel 220 shown in FIG. 19. On the explanation panel 220, an explanation sentence 220*a* that explains contents of the insurance, that is, contents of the rescue pay is described. The rescue pay is one to pay out medals in order to rescue a player who has made a loss. In the first embodiment, the rescue pay is executed when payout of medals in which a payout rate is 60 times or more does not occur in a period since the rescue pay is turned on until a MAX BET game (maximum-bet unit game) reaches 1000 games. The payout rate will be described later. The MAX BET game is a unit game in which the bet number per unit game becomes 3. The bet number per unit game indicates the number of medals bettable per unit game. The maximum number (maximum bet amount) of the medals bettable per unit game is 3. Specifically, the MAX BET game is a unit game in which three medals (that is, the maximum number of medals bettable per unit game) are bet.

The explanation panel 220 includes: a YES panel 221; and a NO panel 222. Based on a signal given from the touch panel sensor 19, the slot machine 10 recognizes whether or not the player carries the insurance, and stores a result of the recognition as recognition result data in a RAM 110 (refer to FIG. 3). In such a way, the slot machine 10 receives the input as to whether on not to carry the insurance.

In Step S13, based on the recognition result data, the slot machine 10 determines whether or not the player carries the insurance. When the player carries the insurance, the processing proceeds to Step S13-1, and when the player does not carry the insurance, the processing proceeds to Step S14.

In Step S13-1, the slot machine 10 turns on a rescue setting flag (initial value thereof is OFF (=0)), that is, sets the rescue setting flag at "1".

In Step S14, when the bet number per unit game becomes 3, the slot machine 10 increases a value Ta of a unit game counter by 1. Here, the value Ta of the unit game counter indicates the number of MAX BET games executed when the rescue pay is turned on.

In Step S15, the slot machine 10 executes the unit game. Specifically, the slot machine 10 scrolls the symbols stopped on the display areas Q1 to Q3, and stops the symbols on the display areas Q1 to Q3 one more time. Here, a payline 214 that passes through the display areas Q1 to Q3 is provided on the liquid crystal display 16. When the symbols are stopped on the display areas Q1 to Q3, three symbols are stopped on the payline 214. Based on a combination of the symbols stopped on the payline 214, the slot machine 10 decides whether or not to pay out the medals to the player.

In Step S16, the slot machine 10 determines a condition that a playing result of the unit game has become a specific playing result, and specifically, determines a condition that the combination of the symbols thus stopped again on the payline 214 has become a specific combination. When this condition is satisfied, the processing proceeds to Step S20, and when this condition is not satisfied, the processing proceeds to Step S17.

In Step S17, the slot machine 10 determines a condition that the rescue setting flag is turned on. When this condition is satisfied, the processing proceeds to Step S18, and when this condition is not satisfied, the execution processing of the game is ended.

In Step S18, the slot machine 10 determines a condition that the value Ta of the unit game counter has coincided with Ta max. When this condition is satisfied, the processing proceeds to Step S19, and when this condition is not satisfied, the execution processing of the game is ended.

In Step S19, the slot machine 10 executes the rescue pay. Specifically, the slot machine 10 provides (pays out) a fixed number of medals (a fixed amount of payout) from (through) a medal payout port 28 (payout port). As a matter of course, the slot machine 10 may store the total number of medals in the RAM 110 (bet memory, refer to FIG. 3), in which the total number indicates a total number of medals owned by the player among medals incorporated in the slot machine 10, and may increase the total number of medals by a fixed number. Thereafter, the slot machine 10 ends the execution processing of the game. Here, "the medals are paid out" means that the medals are provided from the medal payout port 28, or means that the total number of medals stored in the RAM 110 is increased.

In Step S20, the slot machine 10 resets the value Ta of the unit game counter at "0".

In Step S21, based on the combination of the symbols stopped again on the payline 214, the slot machine 10 decides the number of medals to be paid out to the player, and pays out the decided number of medals to the player. Specifically, the slot machine 10 provides the decided number of medals from the medal payout port 28. As a matter of course, the slot machine 10 may store the total number of medals in the RAM 110, and may increase the total number of medals by the decided number. Thereafter, the slot machine 10 ends the execution processing of the game.

Figure 10:
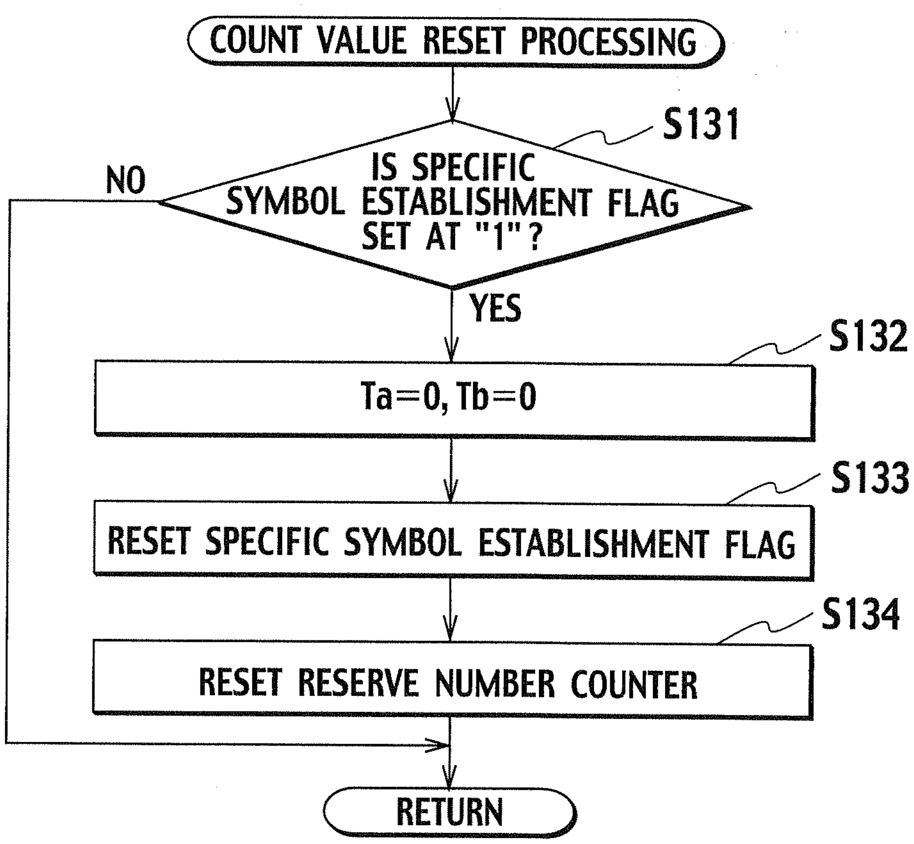
FIG. 10 is a flowchart showing a processing procedure of the slot machine according to the embodiment of the present invention.

Next, a description will be made in detail of a configuration of the slot machine 10 according to this embodiment. As shown in FIG. 10, the slot machine 10 according to this embodiment includes: a cabinet 11; a top box 12 provided on the cabinet concerned; and a main door 13. On the cabinet 11, the liquid crystal display 16 that faces to the player is provided. Moreover, in the cabinet 11, there are provided a variety of constituent members including: a controller 40 (refer to FIG. 3) for electrically controlling this slot machine 10; a hopper 44 (refer to FIG. 3) for controlling the insertion, reserving, and payout of the medals; and the like.

In the first embodiment and the respective embodiments to be described below, the medal is mentioned as an example of currency for executing the unit game; however, the currency is not limited to the medal, and for example, a coin, a token, electronic money, or electronic valuable information (credit) equivalent to these can be mentioned.

The main door 13 is attached onto the cabinet 11 so as to be openable/closable. On a substantial center of the main door 13, the liquid crystal display 16 is provided. As will be described later, the liquid crystal display 16 displays images regarding a variety of games including the unit game.

Below the liquid crystal display 16, there are provided: a medal insertion slot 21 for inserting therethrough the medal for use in the case of playing the game; and a bill identifier 22 for identifying whether or not a bill is appropriate and receiving a normal bill. Moreover, in the vicinity of the medal insertion slot 21 and the bill identifier 22, a variety of operation switches are provided.

As the operation switches, there are provided: a cashout switch 23; a MAX BET switch 24 (bet switch): a BET switch 25 (bet switch); a spin/repeat/bet switch 26 (bet switch); and a start switch 27.

The BET switch 25 is used when the player bets one medal on the unit game. Specifically, every time when the player presses the BET switch 25 once, one medal is bet on the unit game.

The spin/repeat/bet switch 26 is used when the player bets, on the unit game of this time, the same number of medals as the number of medals bet on the previous unit game. Specifically, when the player presses the spin/repeat/bet switch 26 once, the medals of the number corresponding to the number of medals bet on the previous unit game are bet on the unit game of this time.

The start switch 27 is a switch for starting the unit game on the liquid crystal display 16 after the medals are bet. When the start switch 27 is pressed after the medals are bet, the symbols stopped on the display areas Q1 to Q3 are started to be scrolled.

The cashout switch 23 is a switch for paying out the inserted medals. Specifically, when the cashout switch 23 is pressed, the medals of the number corresponding to the total number of medals are provided from the medal payout port 28 open at a lower portion of a front surface of the main door 13, and the provided medals are accumulated in a medal tray 18. Here, the total number of medals indicates the total umber of medals owned by the player among the medals incorporated in the slot machine 10.

The MAX BET switch 24 is a switch for betting the maximum number ("3" in the first embodiment and the respective embodiments to be described below) bettable in one game by one operation. Specifically, when the player presses the MAX BET switch 24 once, three medals are bet on the unit game.

On the front surface of the lower portion of the main door 13, a foot display 34 is provided, and displays a variety of images regarding the games of the slot machine 10. As such images, for example, characters and the like of the slot machine 10 can be mentioned.

On both sides of the foot display 34, lamps 47 are provided, and emit light based on a preset light-emitting pattern. The payout port 28 of the medals is provided below the foot display 34.

On a front surface of the top box 12, an upper display 33 is provided. The upper display 33 is a liquid crystal display, on which various types of information are displayed.

A speaker 29 is provided in the top box 12. Below the upper display 33, there are provided: a ticket printer 35; a card reader 36; a data display 37; and a keypad 38. The ticket printer 35 prints, on a ticket, a bar code in which the respective data such as the number of medals, a date, and an identification number of the slot machine 10 are encoded, and outputs the ticket as a bar code-added ticket 39.

The player allows another slot machine to read the bar code-added ticket 39, and thereby can play the game on the slot machine concerned, and can exchange the bar code-added ticket 39 with bills and the like at a predetermined spot (for example, casher in a casino) of a game arcade.

The card reader 36 is capable of receiving a smart card, and reads data from the smart card inserted thereinto, and writes data into the smart card. The smart card is a card carried by the player, in which data for identifying the player, data regarding a history of the games played by the player, and the like are stored.

Figure 3:
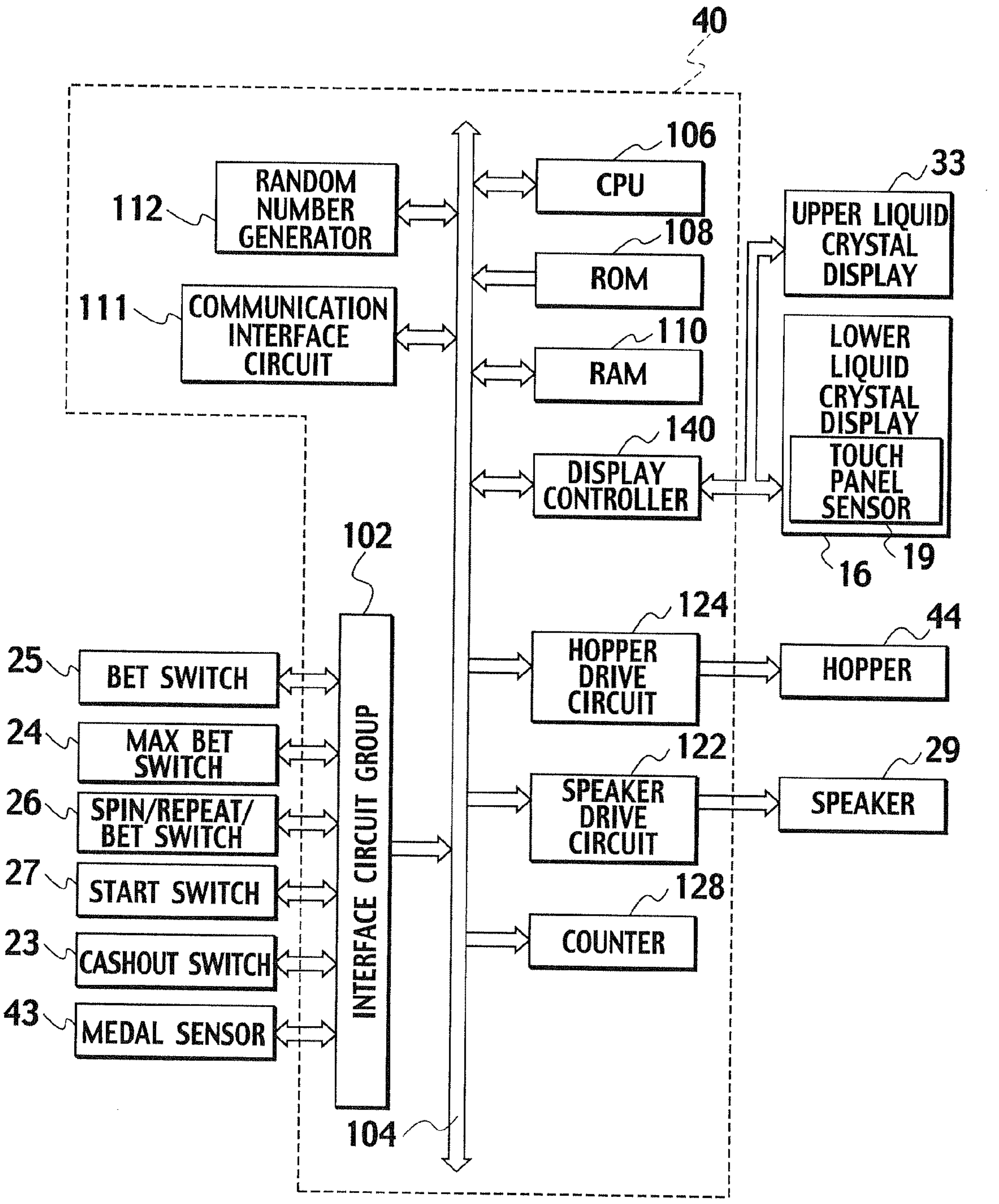
FIG. 3 is a block diagram showing a control circuit of the slot machine according to the embodiment of the present invention.

FIG. 3 is a block diagram showing an electric configuration of the controller 40 provided in the slot machine 10 according to this embodiment and a variety of instruments connected to the controller 40. The controller 40 of the slot machine 10, which is shown in FIG. 3, is a microcomputer, and includes: an interface circuit group 102; an input/output bus 104; a CPU 106; a ROM 108; a RAM 110; a communication interface circuit 111; a random number generator 112; a speaker drive circuit 122; a hopper drive circuit 124; a counter 128; and a display controller 140.

The interface circuit group 102 is connected to the input/output bus 104, and the input/output bus 104 transfers a data signal or an address signal with the CPU 106.

To the interface circuit group 102, there are connected: the start switch 27; the BET switch 25; the MAX BET switch 24; the spin/repeat/bet switch 26; the cashout switch 23; and a medal sensor 43. Then, the respective switches 23 to 27 output signals to the interface circuit group 102 when being pressed by the player. The interface circuit group 102 converts the signals given from the respective switches 23 to 27 into predetermined signals, and transmits the signals to the CPU 106 through the input/output bus 104. Specifically, the respective switches output the signals to the CPU 106 through the interface circuit group 102 and the input/output bus 104.

The medal sensor 43 is a sensor for detecting the medal inserted into the medal insertion slot 21, and is provided in a medal insertion region of the medal insertion slot 21. A detection signal outputted by the medal sensor 43 is supplied to the interface circuit group 102, and is converted into a predetermined signal by the interface circuit group 102, and thereafter, the signal thus converted is transmitted to the CPU 106 through the input/output bus 104. Specifically, the medal sensor 43 outputs the signal to the CPU 106 through the interface circuit group 102 and the input/output bus 104. The CPU 106 increases the total number of medals by 1 every time when being given the signal from the medal sensor 43. However, when the total number of medals is 0, the CPU 106 increases the bet number per unit game by 1 every time when being given the signal from the medal sensor 43. After the bet number per unit game reaches 3, the CPU 106 increases the total number of medals by 1 every time when being given the signal from the medal sensor 43.

To the input/output bus 104, there are connected: the ROM 108 in which a system program, a game execution program, and the like are stored; and the RAM 110 for use as a work area of the CPU 106. Moreover, to the input/output bus 104, there are connected: the random number generator 112; the communication interface circuit 111; the display controller 140; the hopper drive circuit 124; the speaker drive circuit 122; and the counter 128.

The CPU 106 reads out the game execution program and executes the unit game on the occasion when a start operation of the game is received by the start switch 27. The game execution program is a program for executing the unit game on the liquid crystal display 16 through the display controller 140.

Specifically, the game execution program is programmed so as to execute the unit game in which the symbols are scrolled on the respective display areas Q1 to Q3 (refer to FIG. 2), and thereafter, the symbols are stopped again.

The RAM 110 is used as the area of the work by the CPU 106. The communication interface circuit 111 is connected to a whole server or the like, and transmits the data regarding the history of the plays executed in the slot machine 10, and the like to the whole server. Moreover, the communication interface circuit 111 receives a variety of data transmitted from the whole server.

The random number generator 112 generates a random number for deciding the symbols to be stopped in the unit game executed on the liquid crystal display 16.

The speaker drive circuit 122 outputs audio data to the speaker 29. Specifically, the CPU 106 reads out the audio data stored in the ROM 108, and transmits the audio data to the speaker drive circuit 122 through the input/output bus 104. In such a way, a predetermined effect sound is emitted from the speaker 29.

The hopper drive circuit 124 outputs a payout signal to the hopper 44 when cashout occurs. Specifically, upon receiving the cashout signal from the cashout switch 23, the CPU 106 outputs a drive signal to the hopper drive circuit 124 through the input/output bus 104. In such a way, the hopper pays out the medals of the number corresponding to the total number of medals.

The display controller 140 performs a display control for executing the unit game on the liquid crystal display 16. Specifically, the CPU 106 generates a signal of an image display command corresponding to a state of the unit game and a result of the unit game, and outputs the signal of the image display command to the display controller 140 through the input/output bus 104. Upon receiving the signal of the image display command from the CPU 106, the display controller 140 generates a drive signal for driving the liquid crystal display 16 based on the image display command, and outputs the drive signal thus generated to the liquid crystal display 16. In such a way, a predetermined image is displayed on the liquid crystal display 16.

The touch panel 19 is provided on the surface of the liquid crystal display 16. The player touches the touch panel sensor 19, whereby data regarding a touched position on the liquid crystal display 16 is detected, and is transmitted to the CPU 106.

The counter 128 stores a variety of count values (specifically described later).

Next, a description will be made of main processing executed by the slot machine 10 along flowcharts of FIG. 4 to FIG. 8. The slot machine 10 repeatedly performs the main processing. Specifically, one piece of the main processing composes one processing cycle.

In Step S31, the CPU 106 receives medal bet for the unit game. Specifically, the CPU 106 receives the signal given from the MAX BET switch 24, the BET switch 25, or the spin/repeat/bet switch 26. Upon being given the signal from the MAX BET switch 24, the CPU 106 sets the bet number per unit game at 3, and meanwhile, reduces the total number of medals by 3. Every time when being given the signal from the BET switch 25, the CPU 106 increases the bet number per unit game by 1, and meanwhile, reduces the total number of medals by 1. Upon being given the signal from the spin/repeat/bet switch 26, the CPU 106 uses the bet number per unit game of the previous time (one cycle before) at the bet number per unit game of this time (current cycle), and meanwhile, reduces the total number of medals by the bet number per unit game of this time. When the total number of medals is 0, the CPU 106 increases the bet number per unit game by 1 every time when being given the signal from the medal sensor 43. In such a way, the CPU 106 receives the medal bet.

In Step S32, the CPU 106 determines a condition that the rescue setting flag (formed on the RAM 110; the initial value thereof is "OFF (=0)") is "ON (=1)". When this condition is satisfied, the processing proceeds to Step S33, and when this condition is not satisfied, the processing proceeds to Step S32-1.

In Step S32-1, the CPU 106 receives the input as to whether or not to carry the insurance. Specifically, the CPU 106 displays an image shown in FIG. 18A on the upper display 33, and displays the image shown in FIG. 18B on the liquid crystal display 16.

The image displayed on the upper display 33 includes: an image 302 in which a woman is drawn; and an image 200 indicating that the rescue pay is turned off. Meanwhile, the image displayed on the liquid crystal display 16 includes: display areas 31, 32*a* and 32*b*; and the rescue pay button 210; as well as the display areas Q1 to Q3; and the payline 214. These images are always displayed on the liquid crystal display 16. The total number of medals is displayed on the display area 31. On the display area 32*a*, the total number of medals paid to the player by the result of the unit game of this time (that is, in the current cycle) or the rescue pay is displayed. On the display area 32*b*, the bet number per unit game of this time (that is, in the current cycle) is displayed. On the rescue pay button 210, it is displayed whether or not the rescue pay is turned on. Specifically, when the rescue pay is turned off, "RESCUEPAY MORE INFO" is displayed, and when the rescue pay is turned on, "RESCUE ON MORE INFO" is displayed.

The CPU 106 determines whether or not the player has pressed the rescue pay button 210 based on the signal given from the touch panel sensor 19. In the case of determining that the player has pressed the rescue pay button 210, the CPU 106 displays an image shown in FIG. 19 on the liquid crystal display 16. This image includes the explanation panel 220. On the explanation panel 220, the explanation sentence 220*a* that explains the contents of the insurance, that is, the contents of the rescue pay is described. In the first embodiment, the rescue pay is executed when the payout of the medals in which the payout rate is 60 times or more does not occur in the period since the rescue pay is turned on until the MAX BET game reaches 1000 games. The explanation panel 220 includes: the YES panel 221; and the NO panel 222. Based on the signal given from the touch panel sensor 19, the CPU 106 recognizes whether or not the player carries the insurance, and stores the result of the recognition as the recognition result data in the RAM 110. In such a way, the slot machine 10 receives the input as to whether on not to carry the insurance.

In Step S32-2, the CPU 106 determines whether or not the player carries the insurance based on the recognition result data. When the player carries the insurance, the processing proceeds to Step S32-3, and when the player does not carry the insurance, the processing proceeds to Step S33.

Figure 20A:
FIG. 20A is an explanatory view showing an example of an image displayed by the slot machine according to the embodiment of the present invention.
Figure 20B:
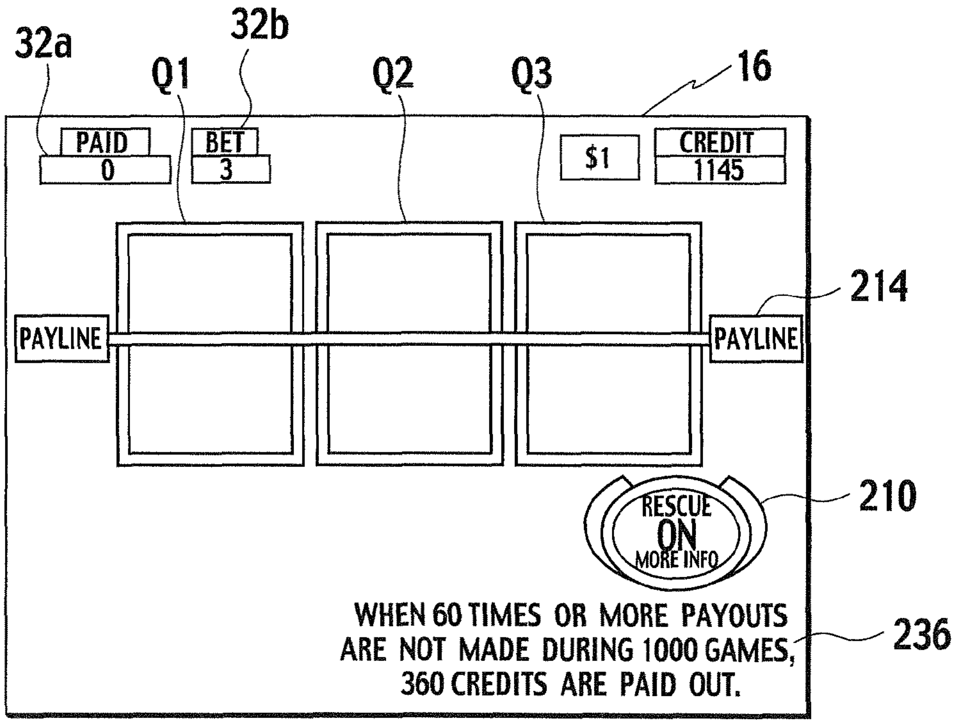
FIG. 20B is an explanatory view showing an example of an image displayed by the slot machine according to the embodiment of the present invention.

In Step S32-3, the CPU 106 turns on the rescue setting flag. Hence, the rescue setting flag indicates that the rescue pay is turned on. Moreover, the CPU 106 displays an image shown in FIG. 20A on the upper display 33, and displays an image shown in FIG. 20B on the liquid crystal display 16. The image displayed on the upper display 33 includes an image 230 showing that the rescue pay is turned on. Furthermore, "RESCUE ON MORE INFO" is displayed on the rescue pay button 210. Furthermore, an image 236 showing the contents of the rescue pay is displayed on the liquid crystal display 16.

In Step S33, the CPU 106 determines a condition that the start switch 27 is turned on, and specifically, determines a condition that the signal is given from the start switch 27. When this condition is satisfied, the processing proceeds to Step S34, and when this condition is not satisfied, the processing proceeds to Step S32.

Figure 5:
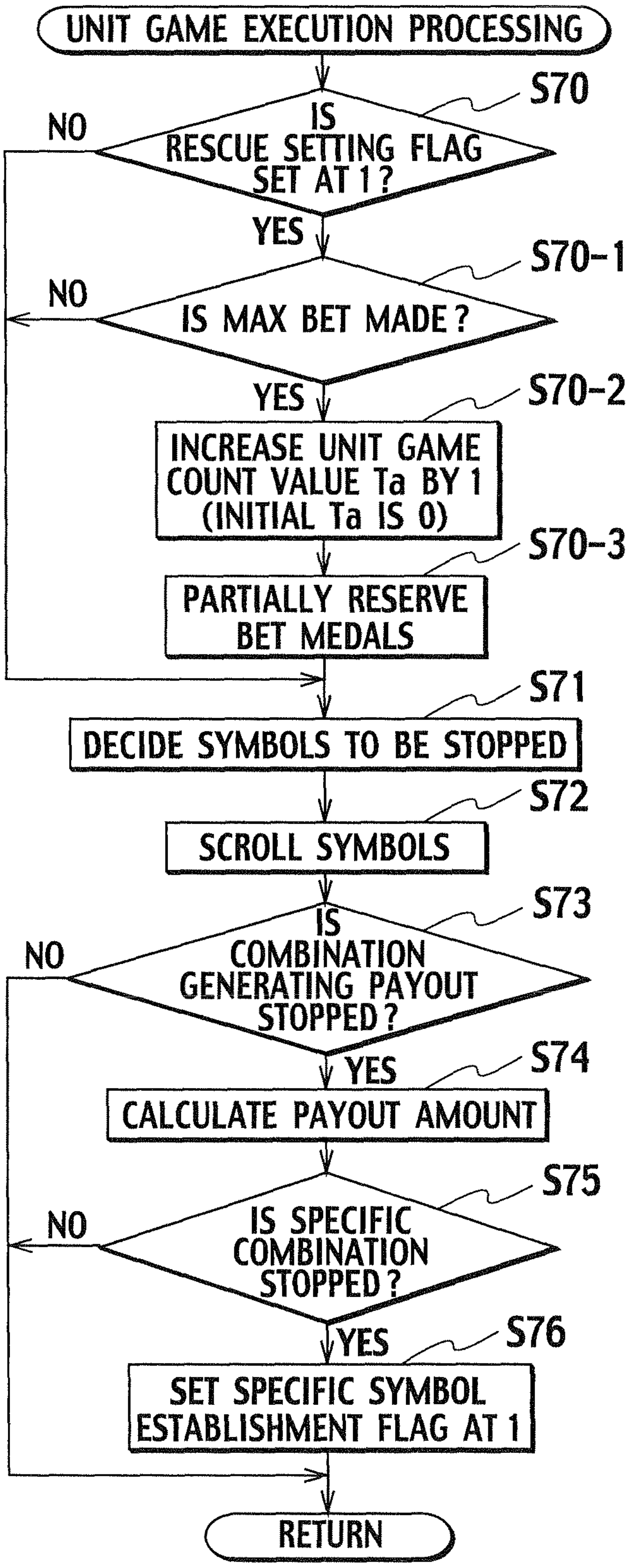
FIG. 5 is a flowchart showing a processing procedure of the slot machine according to the embodiment of the present invention.

In Step S34, the CPU 106 performs unit game execution processing shown in FIG. 5. In brief, the CPU 106 executes the unit game, and in response to a result thereof, calculates the payout number of medals.

Figure 6:
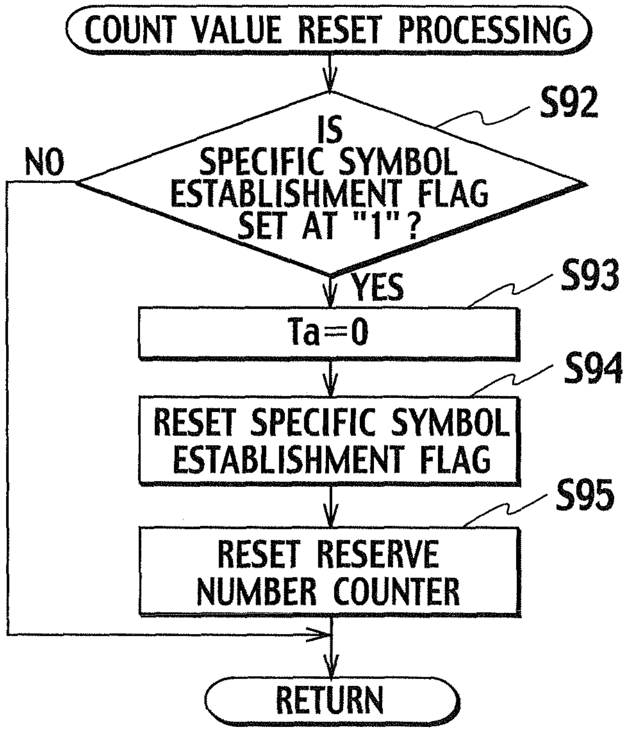
FIG. 6 is a flowchart showing a processing procedure of the slot machine according to the embodiment of the present invention.

In Step S35, the CPU 106 performs count value reset processing shown in FIG. 6. In brief, when a fixed condition is satisfied, the CPU 106 performs processing for resetting the count value.

Figure 7:
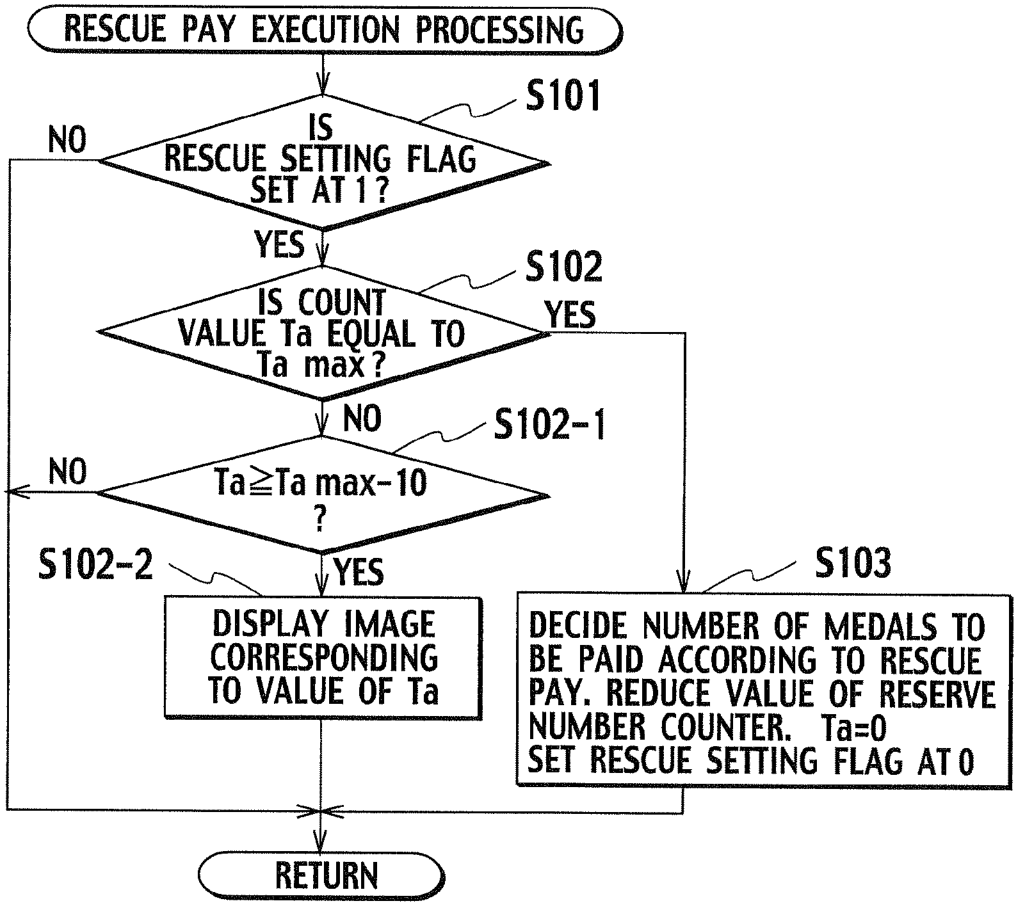
FIG. 7 is a flowchart showing a processing procedure of the slot machine according to the embodiment of the present invention.

In Step S36, the CPU 106 performs rescue pay execution processing shown in FIG. 7. In brief, when a fixed condition is satisfied, the CPU 106 calculates the payout number of medals by the rescue pay.

Figure 8:
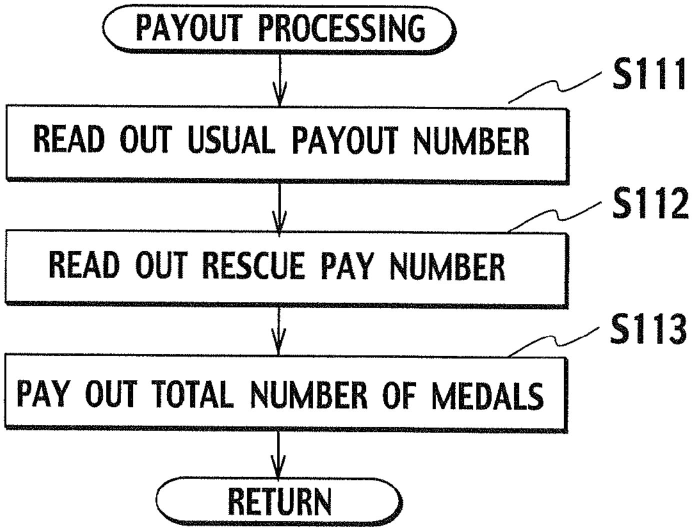
FIG. 8 is a flowchart showing a processing procedure of the slot machine according to the embodiment of the present invention.

In Step S37, the CPU 106 performs payout processing shown in FIG. 8. In brief, the CPU 106 performs processing for providing the medals of the number corresponding to the number calculated in Step S34 and the number calculated in Step S36 from the medal payout port 28.

Next, a description will be made of the unit game execution processing based on FIG. 5. In Step S70, the CPU 106 determines a condition that the rescue setting flag is turned on. When this condition is satisfied, the processing proceeds to Step S70-1, and when this condition is not satisfied, the processing proceeds to Step S71.

In Step S70-1, based on the bet number per unit game, which is stored in the RAM 110, the CPU 106 determines a condition that the MAX BET is made for the unit game in the current cycle (that is, a condition that the bet number per unit game becomes 3). When this condition is satisfied, the processing proceeds to Step S70-2, and when this condition is not satisfied, the processing proceeds to Step S71.

In Step S70-2, the CPU 106 increases the value Ta of the unit game counter (formed on the counter 128; an initial value thereof is "0") by 1. Hence, the value Ta of the unit game counter indicates the number of MAX BET games when the rescue pay is turned on.

In Step S70-3, the CPU 106 partially reserves the bet medals as reserved medals (reserved bet). Specifically, the CPU 106 increases a value Tc of a reserve number counter (formed on the counter 128; an initial value thereof is "0") by 1, and meanwhile, reduces the bet number per unit game by 1.

In Step S71, the CPU 106 acquires a random number from the random number generator 12 for each of the display areas Q1 to Q3, and based on the acquired random number, decides the symbol to be stopped on each of the display areas Q1 to Q3.

In Step S72, the CPU 106 scrolls the symbols individually stopped on the display areas Q1 to Q3, and stops the symbols decided in Step S71. In such a way, three symbols are stopped again on the payline 214.

Figure 17:
FIG. 17 is an explanatory view showing an example of a payout table referred to by the slot machine according to the embodiment of the present invention.
Figure 17:
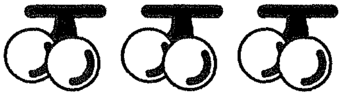
Figure 17:
Figure 17:

In Step S73, based on a combination of the symbols stopped again on the payline 214 and based on a payout table shown in FIG. 17, the CPU 106 determines a condition that a combination of the symbols, which generates the payout of the medals, is stopped on the payline 214. When this condition is satisfied, the processing proceeds to Step S74, and when this condition is not satisfied, the unit game execution processing is ended. Here, the payout table is stored in the ROM 108. The payout table shows a correspondence relationship among the combination of the symbols, which generates the payout of the medals, the bet number per unit game, and the payout rate. Here, "1ST Credit" means that the bet number per unit game is 1, "2ND Credit" means that the bet number per unit game is 2, and "3RD Credit" means that the bet number per unit game is 3. Hence, for example, when three symbols in each of which three pieces of "BAR" are longitudinally arrayed are stopped on the payline 214, and the bet number per unit game is 2, the payout rate becomes 120 times. A value obtained by multiplying the bet number per unit game by the payout rate becomes the number of medals to be paid to the player.

In Step S74, based on the payout table, the combination of the symbols stopped again on the payline 214, and the bet number per unit game, the CPU 106 calculates a payout amount, that is, the number of medals to be paid to the player. The CPU 106 stores the calculated number as a usual payout number in the RAM 110. An initial value of the usual payout number is 0.

In Step S75, the CPU 106 determines a condition that a specific combination is stopped again on the payline 214. When this condition is satisfied, the processing proceeds to Step S76, and when this condition is not satisfied, the unit game execution processing is ended. Here, the specific combination is a combination in which the payout rate becomes 60 times or more. In accordance with the payout table, a combination assembling three symbols each of which is formed of letters of "DOUBLE" and a woman face and the combination assembling three symbols in each of which three pieces of "BAR" are longitudinally arrayed become the specific combinations no matter what the bet number per unit game may be. A combination assembling three symbols in each of which two pieces of "BAR" are longitudinally arrayed becomes the specific combination when the bet number per unit game becomes 2 or more. A combination assembling three pieces of "CHERRY" becomes the specific combination when the bet number per unit game becomes 3.

In Step S76, the CPU 106 turns on a specific symbol establishment flag (sets the specific symbol establishment flag at 1). The specific symbol establishment flag is formed on the RAM 110, and an initial value thereof is off (=0). Thereafter, the CPU 106 ends the unit game execution processing.

Next, a description will be made of the count value reset processing based on FIG. 6. In Step S92, the CPU 106 determines a condition that the specific establishment flag is turned on. When this condition is satisfied, the processing proceeds to Step S93, and when this condition is not satisfied, the count value reset processing is ended.

In Step S93, the CPU 106 resets the value Ta of the unit game counter at 0. In Step S94, the CPU 106 turns off the specific symbol establishment flag (resets the specific symbol establishment flag). Thereafter, the CPU 106 ends the count value reset processing.

Next, a description will be made of the rescue pay execution processing based on FIG. 7. In Step S101, the CPU 106 determines a condition that the rescue setting flag is turned on. When this condition is satisfied, the processing proceeds to Step S102, and when this condition is not satisfied, the rescue pay execution processing is ended.

In Step S102, the CPU 106 determines a condition that the value Ta of the unit game counter coincides with Ta max (=100) (this is so-called "ceiling", and this value is stored in the ROM 108). When this condition is satisfied, the processing proceeds to Step S103, and when this condition is not satisfied, the processing proceeds to Step S102-1.

In Step S102-1, the CPU 106 determines a condition that the value Ta of the unit game counter is (Ta max-10) or more. When this condition is satisfied, the processing proceeds to Step S102-2, and when this condition is not satisfied, the rescue pay execution processing is ended.

Figure 21A:
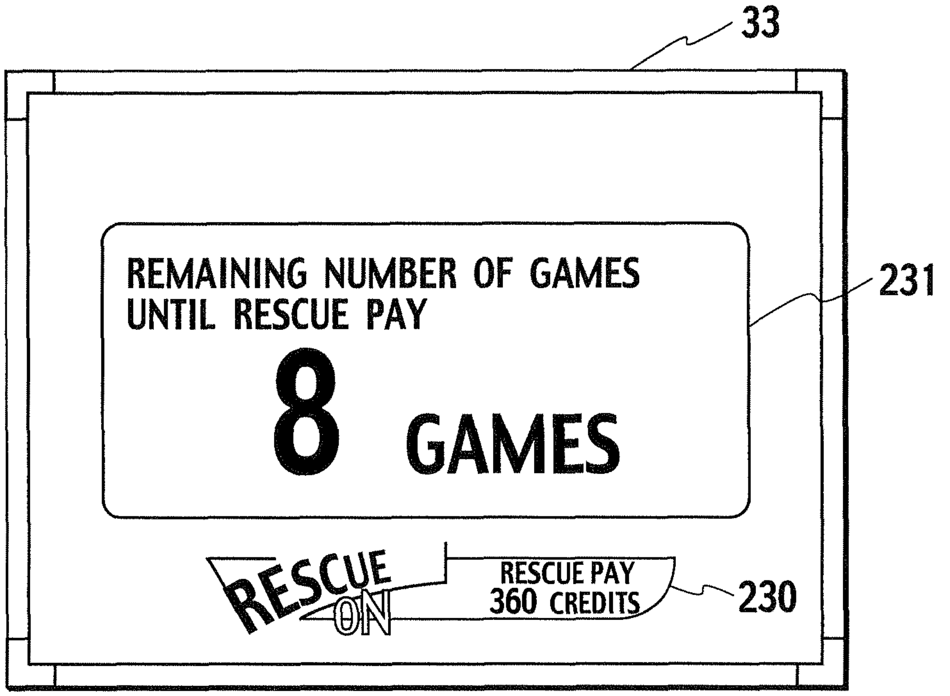
FIG. 21A is an explanatory view showing an example of an image displayed by the slot machine according to the embodiment of the present invention.
Figure 21B:
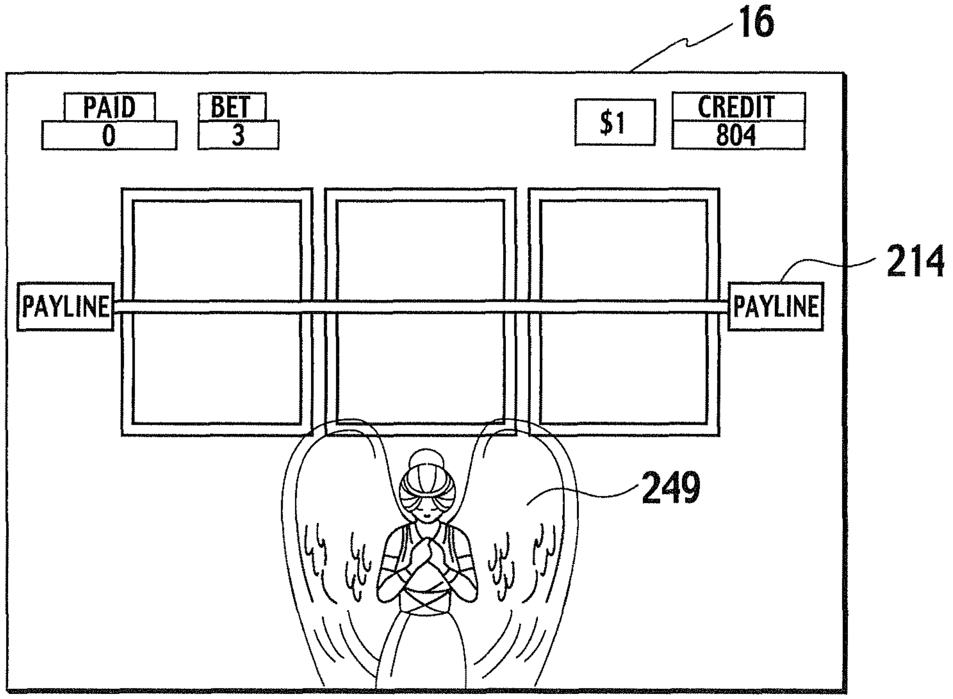
FIG. 21B is an explanatory view showing an example of an image displayed by the slot machine according to the embodiment of the present invention.
Figure 22A:
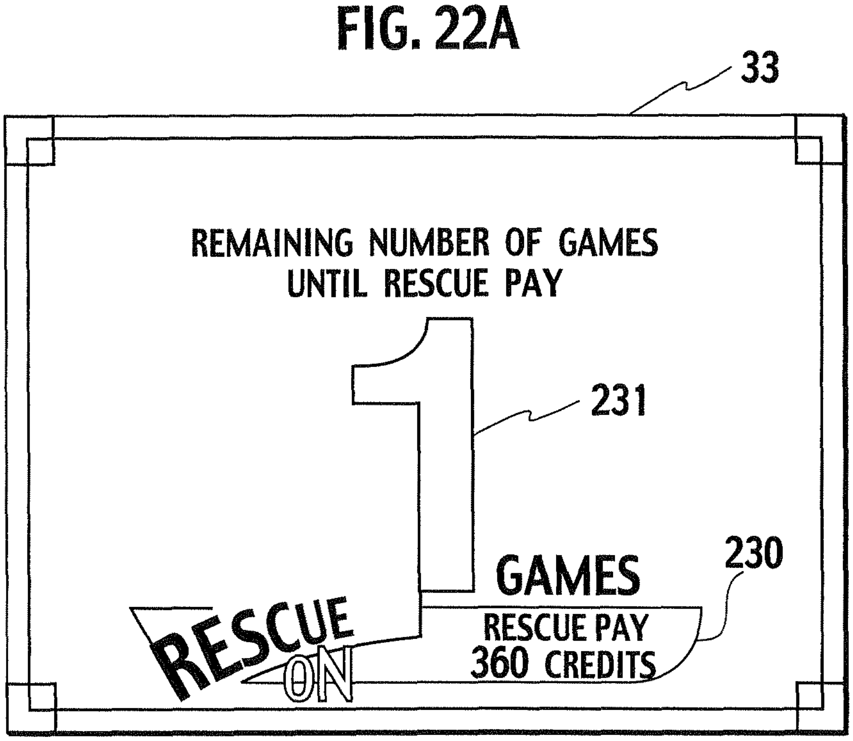
FIG. 22A is an explanatory view showing an example of an image displayed by the slot machine according to the embodiment of the present invention.
Figure 22B:
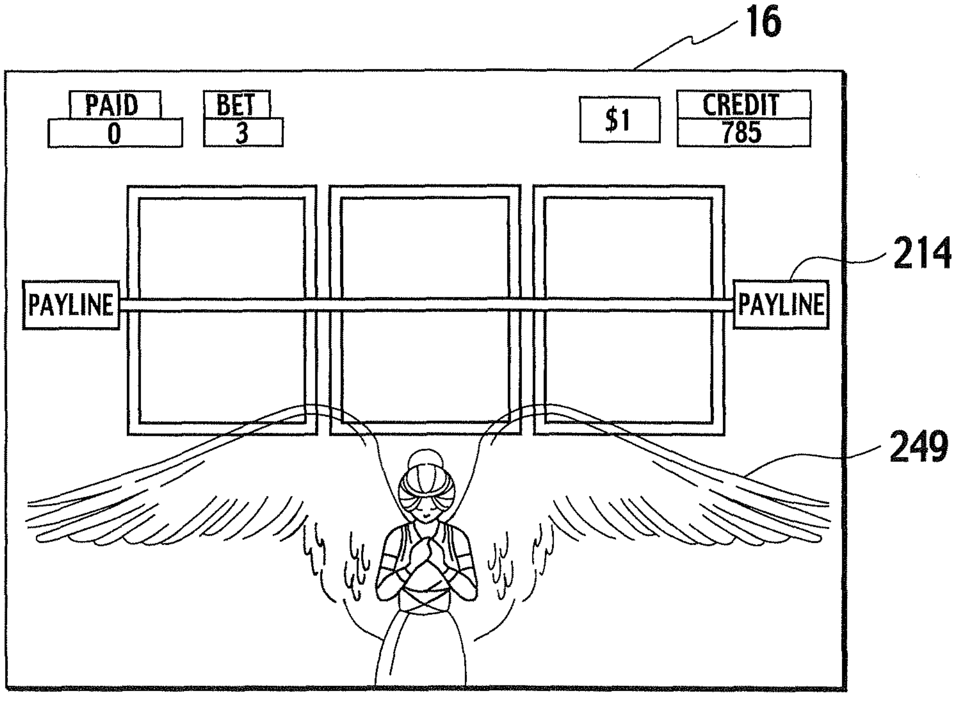
FIG. 22B is an explanatory view showing an example of an image displayed by the slot machine according to the embodiment of the present invention.

In Step S102-2, the CPU 106 displays images corresponding to the value Ta of the unit game counter on the upper display 33 and the liquid crystal display 16. Specifically, the CPU 106 displays the remaining number of MAX BET games (=Ta max-Ta) until the rescue pay is generated on the upper display 33, and displays an image in which a woman angle is drawn on the liquid crystal display 16. Display examples of the above are shown in FIG. 21A to FIG. 22B. FIG. 21A and FIG. 22B show images displayed when the remaining number of MAX BET games is "8", and FIG. 22A and FIG. 22B show images displayed when the remaining number of MAX BET games is "1". Specifically, such an image 231 showing the remaining number of MAX BET games is displayed on the upper display 33. Moreover, such an image 249 in which the woman angel is drawn is displayed on the liquid crystal display 16. The woman angle shown by the image 249 gradually expands her wings every time when the remaining number of MAX BET games is reduced. Thereafter, the CPU 106 ends the rescue pay execution processing.

In Step S103, the CPU decides an amount of the rescue pay, that is, the number of medals to be paid by the rescue pay. In the first embodiment and the respective embodiments to be described later, the CPU 106 decides the number of medals to be paid by the rescue pay at 360. The CPU 106 stores the decided number as the rescue pay number in the RAM 110. An initial value of the rescue pay number is 0.

Figure 23A:
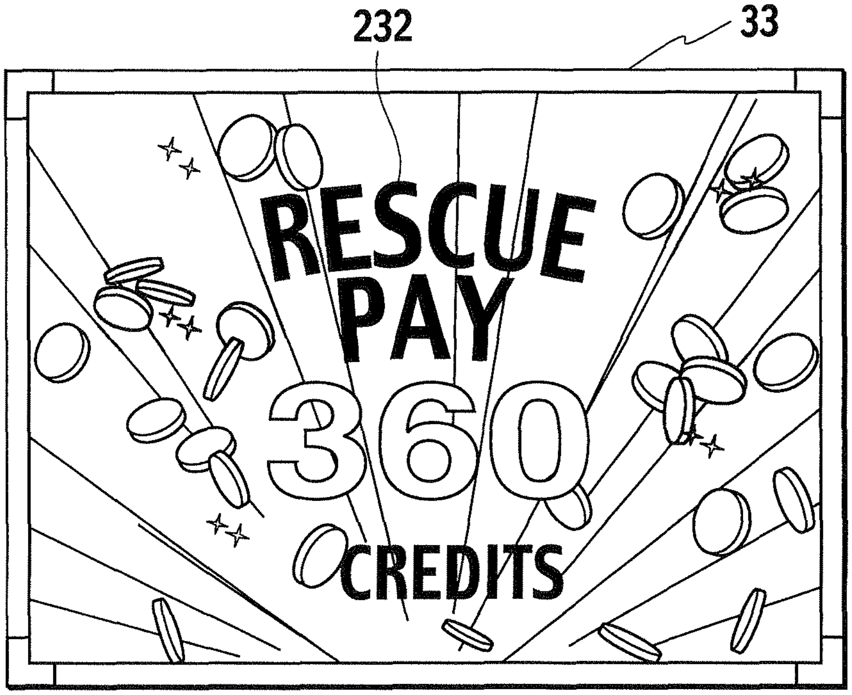
FIG. 23A is an explanatory view showing an example of an image displayed by the slot machine according to the embodiment of the present invention.
Figure 23B:
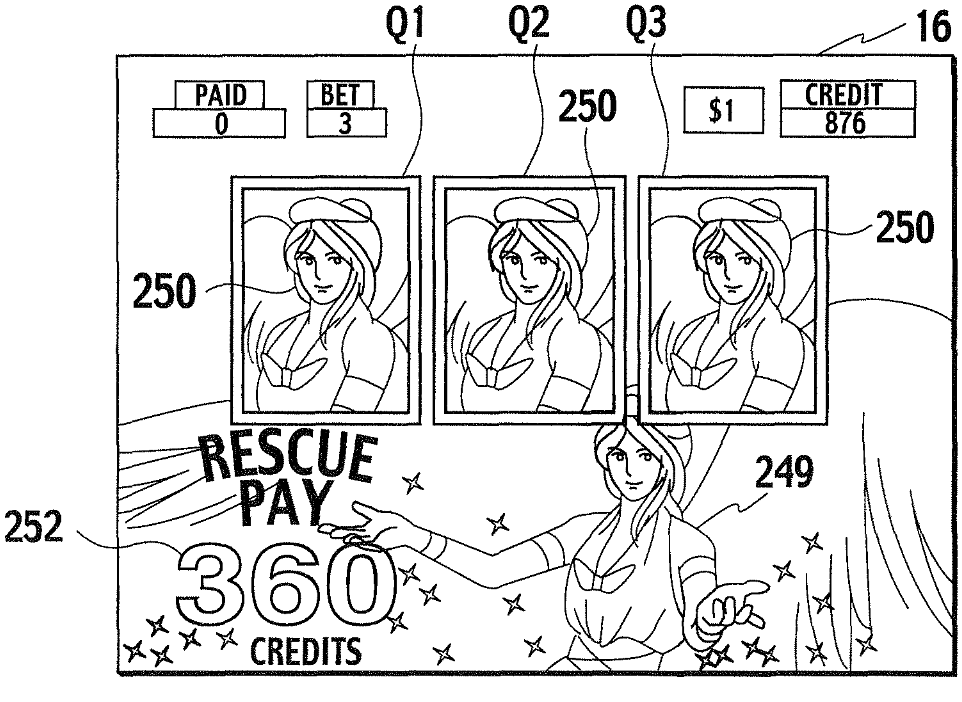
FIG. 23B is an explanatory view showing an example of an image displayed by the slot machine according to the embodiment of the present invention.

Moreover, the CPU 106 resets the value Ta of the unit game counter at 0, and reduces the value Tc of the reserve number counter by 360. When the value Tc of the reserve number counter is less than 360, the CPU 106 resets the value Tc of the reserve number counter at 0. In such a way, the CPU 106 pays out, as the rescue pay, a part or the entirety of the medals reserved in the slot machine 10. Furthermore, the CPU 106 displays images showing that the rescue pay is generated and showing the payout number by the rescue pay on the upper display 33 and the liquid crystal display 16. Display examples are shown in FIG. 23A and FIG. 23B. On the upper display 33, such an image 232 shown in FIG. 23A is displayed, and on the liquid crystal display 16, such images shown in FIG. 23B are displayed. On the upper display 33, the image 232 showing that the rescue pay is generated is displayed. On the liquid crystal display 16, there are displayed: images 249 and 250 in which the woman angel is drawn; and an image 252 showing that the rescue pay is generated. The woman angel shown by the image 249 expands the hands, and stars spill out of the hands. In such a way, the slot machine 10 can impress the player that the rescue pay will be generated. The images 250 are individually displayed on the display areas Q1 to Q3. Moreover, the CPU 106 turns off the rescue setting flag. Thereafter, the CPU 106 ends the rescue pay execution processing.

Next, a description will be made of the payout processing based on FIG. 8. In Step S111, the CPU 106 reads out the payout usual number from the RAM 110. In Step S112, the CPU 106 reads out the rescue pay number from the RAM 110.

Figure 24:
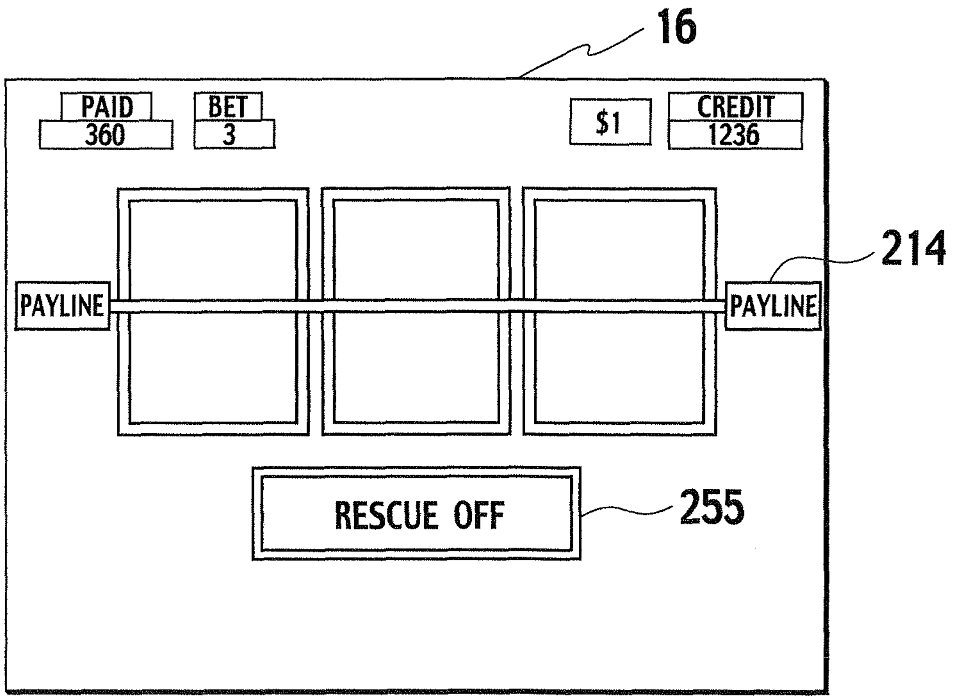
FIG. 24 is an explanatory view showing an example of an image displayed by the slot machine according to the embodiment of the present invention.

In Step S113, the CPU 106 pays out the medals of the number corresponding to the total of the usual payout number and the rescue pay number. Specifically, the CPU 106 provides the medals of the number corresponding to the total number from the medal payout port 28. Furthermore, in the case of having executed the rescue pay (that is, in the case of having paid out the medals of the number corresponding to the rescue pay number when the rescue pay number is 360), as shown in FIG. 24, the CPU 106 displays an image 255 showing that the rescue pay is turned off. Thereafter, the CPU 106 sets both of the usual payout number and the rescue pay number at 0, and ends the payout processing.

(Second Embodiment)

Next, a description will be made of a second embodiment. The second embodiment is similar to the first embodiment except that unit game execution processing, count value reset processing, and rescue pay execution processing are different from those of the first embodiment. Accordingly, a description will be made only of these different points.

Figure 9:
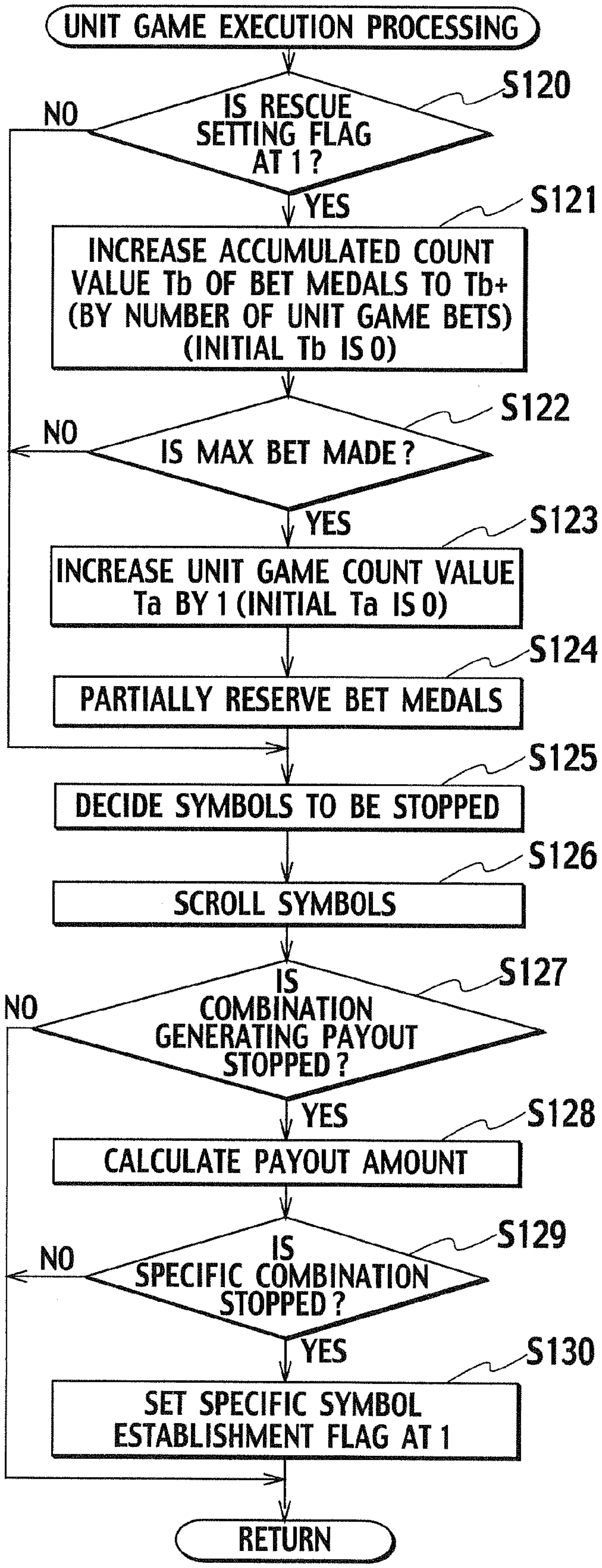
FIG. 9 is a flowchart showing a processing procedure of the slot machine according to the embodiment of the present invention.

First, a description will be made of the unit game execution processing based on FIG. 9. In Step S120, the CPU 106 determines a condition that the rescue setting flag is turned on. When this condition is satisfied, the processing proceeds to Step S121, and when this condition is not satisfied, the processing proceeds to Step S125.

In Step S121, the CPU 106 increases a value Tb of an accumulated bet counter (formed on the counter 128; an initial value thereof is 0) indicating the accumulated number of bet medals by the bet number per unit game.

In Step S122, the CPU 106 determines a condition that the MAX BET is made, that is, the bet number per unit game is 3. When this condition is satisfied, the processing proceeds to Step S123, and when this condition is not satisfied, the processing proceeds to Step S125.

In Step S123, the CPU 106 increases the value Ta of the unit game counter by 1. In Step S124, the CPU 106 partially reserves the bet medals. Specifically, the CPU 106 increases the value Tc of the reserve number counter by 1, and meanwhile, reduces the bet number per unit game by 1. Step S125 to Step S130 are similar to Step S71 to Step S76 which are shown in FIG. 5, and accordingly, a description thereof will be omitted.

Next, a description will be made of the count value reset processing based on FIG. 10. In Step S131, the CPU 106 determines a condition that the specific symbol establishment flag is turned on. When this condition is satisfied, the processing proceeds to Step S132, and when this condition is not satisfied, the count value resent processing is ended.

In Step S132, the CPU 106 resets the value Ta of the unit game counter and the value Tb of the accumulated bet counter at 0. In Step S133, the CPU 106 turns off the specific symbol establishment flag (resets the specific symbol establishment flag at 0). In Step S134, the CPU 106 resets the value Tc of the reserve number counter at 0. Thereafter, the CPU 106 ends the count value reset processing.

Figure 11:
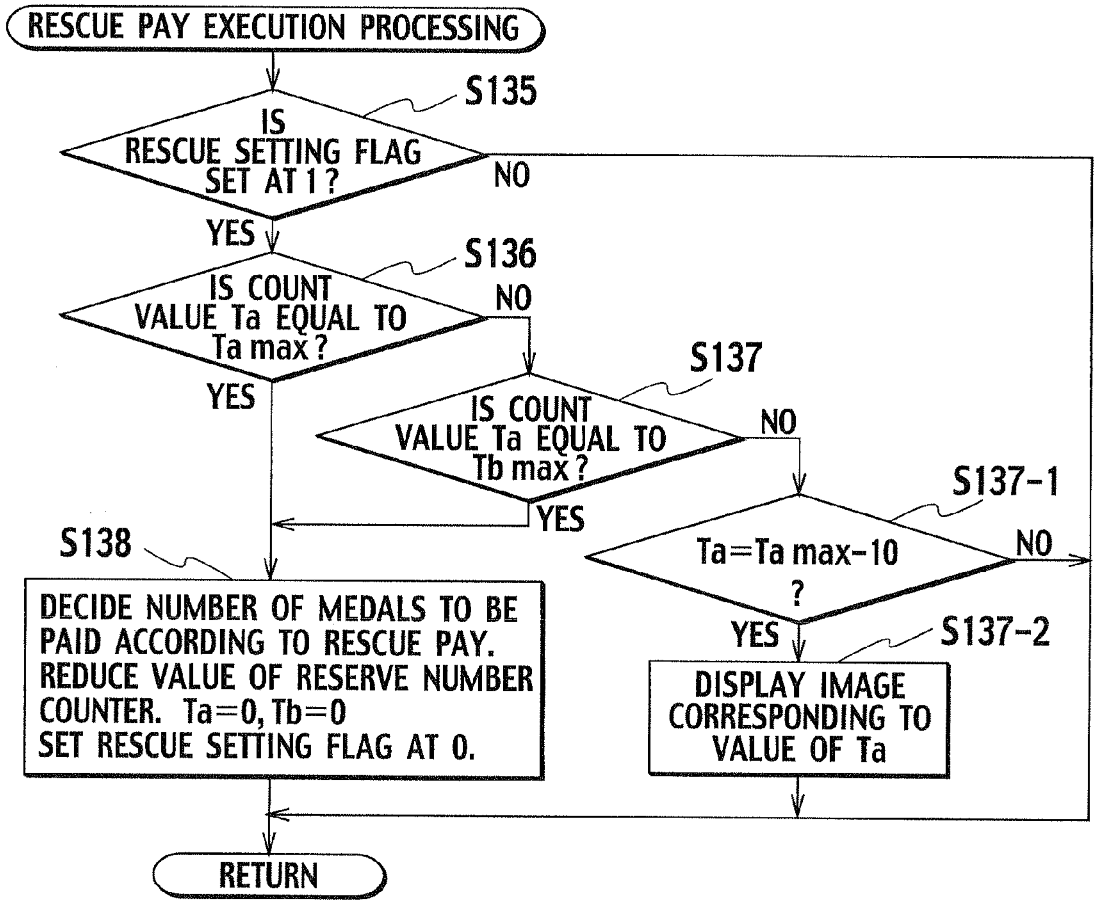
FIG. 11 is a flowchart showing a processing procedure of the slot machine according to the embodiment of the present invention.

Next, a description will be made of the rescue pay execution processing based on FIG. 11. In Step S135, the CPU 106 determines a condition that the rescue setting flag is turned on. When this condition is satisfied, the processing proceeds to Step S136, and when this condition is not satisfied, the rescue pay execution processing is ended.

In Step S136, the CPU 106 determines a condition that the value Ta of the unit game counter coincides with Ta max. When this condition is satisfied, the processing proceeds to Step S138, and when this condition is not satisfied, the processing proceeds to Step S137.

In Step S137, the CPU 106 determines a condition that the value Tb of the accumulated bet counter coincides with Tb max (for example, 5000; this value is stored in the ROM 108). When this condition is satisfied, the processing proceeds to Step S138, and when this condition is not satisfied, the processing proceeds to Step S137-1.

Step S137-1 and Step S137-2 are similar to Step S102-1 and Step S102-2 which are shown in FIG. 7, and accordingly, a description thereof will be omitted.

In Step S138, the CPU decides an amount of the rescue pay, that is, the number of medals to be paid by the rescue pay. The CPU 106 stores the decided number as the rescue pay number in the RAM 110.

Moreover, the CPU 106 resets the value Ta of the unit game counter and the value Tb of the accumulated bet counter at 0, and reduces the value Tc of the reserve number counter by 360. When the value Tc of the reserve number counter is less than 360, the CPU 106 resets the value Tc of the reserve number counter at 0. In such a way, the CPU 106 pays out, as the rescue pay, a part or the entirety of the medals reserved in the slot machine 10. Furthermore, the CPU 106 displays images showing that the rescue pay is generated and showing the payout number by the rescue pay on the upper display 33 and the liquid crystal display 16. Specifically, the CPU 106 displays the images shown in FIG. 23A and FIG. 23B. Furthermore, the CPU 106 turns off the rescue setting flag. Thereafter, the CPU 106 ends the rescue pay execution processing.

(Third Embodiment)

Figure 12:
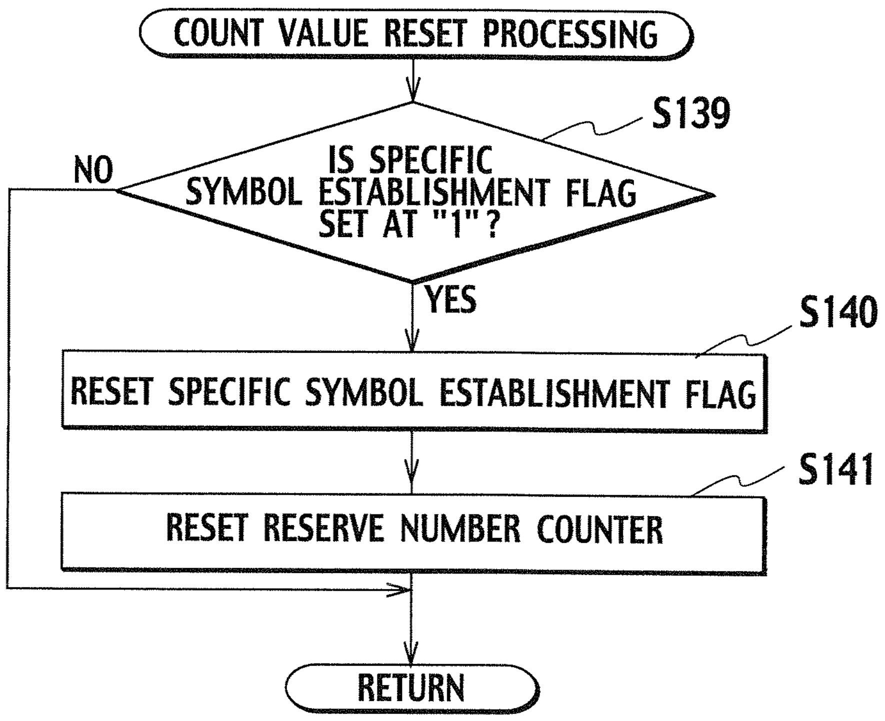
FIG. 12 is a flowchart showing a processing procedure of the slot machine according to the embodiment of the present invention.

Next, a description will be made of a third embodiment. The third embodiment is similar to the first embodiment except that count value reset processing is different from that of the first embodiment. Accordingly, a description will be made only of the different point based on FIG. 12.

In Step S139, the CPU 106 determines a condition that the specific symbol establishment flag is turned on. When this condition is satisfied, the processing proceeds to Step S140, and when this processing is not satisfied, the count value reset processing is ended.

In Step S140, the CPU 106 turns off (resets) the specific symbol establishment flag. In Step S141, the CPU 106 resets the value Tc of the reserve number counter. Thereafter, the CPU 106 ends the count value reset processing.

(Fourth Embodiment)

Next, a description will be made of a fourth embodiment. The fourth embodiment is similar to the first embodiment except that main processing and unit game execution processing are different from those of the first embodiment, and accordingly, a description will be made only of these different points.

Figure 13:
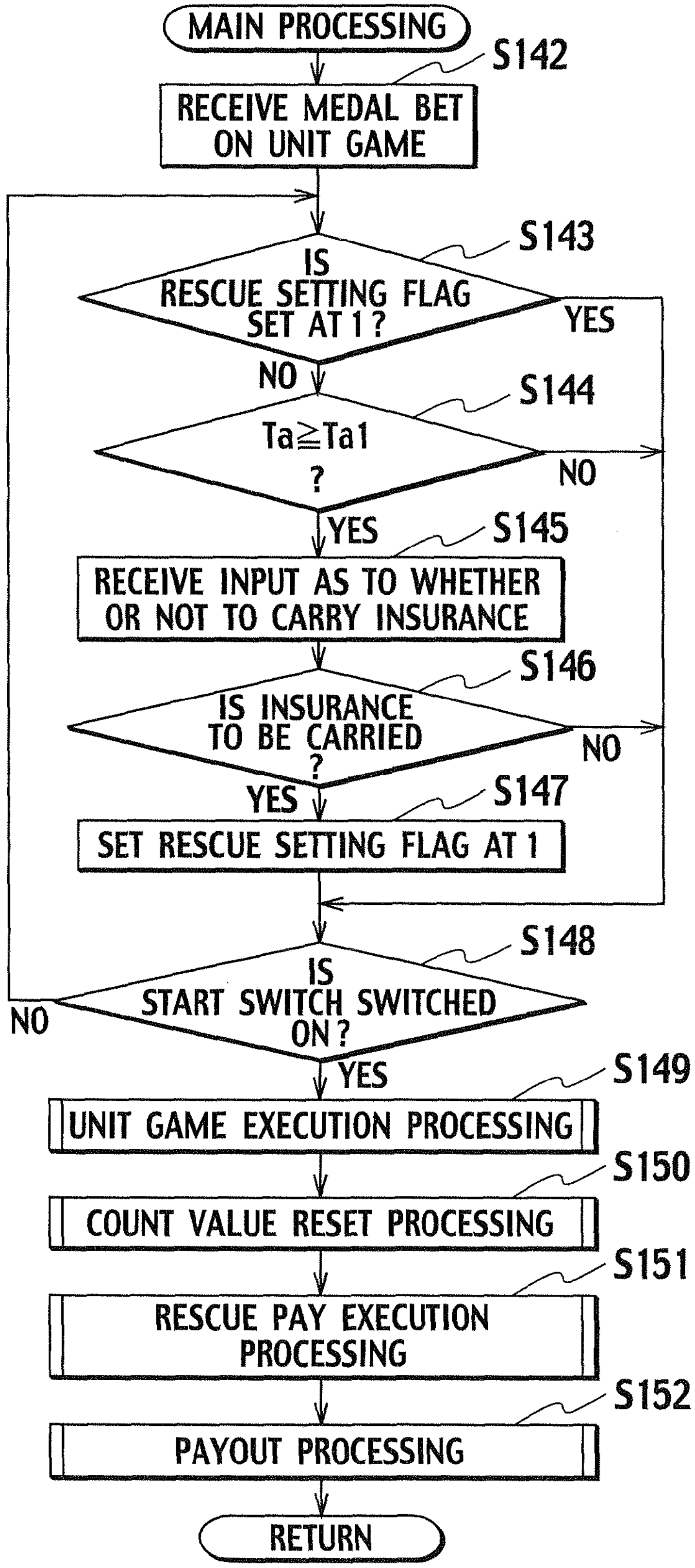
FIG. 13 is a flowchart showing a processing procedure of the slot machine according to the embodiment of the present invention.

First, a description will be made of the main processing based on FIG. 13. In Step S142, the CPU 106 performs similar processing to that of Step S31 shown in FIG. 4.

In Step S143, the CPU 106 determines a condition that the rescue setting flag is turned on. When this condition is satisfied, the processing proceeds to Step S148, and when this condition is not satisfied, the processing proceeds to Step S144.

In Step S144, the CPU 106 determines a condition that the value Ta of the unit game counter is Ta1 or more. In this case, the value Ta1 is smaller than Ta max, and for example, becomes 100, and this value Ta1 is stored in the ROM 108. When this condition is satisfied, the processing proceeds to Step S145, and when this condition is not satisfied, the processing proceeds to Sep S148.

Figure 4:
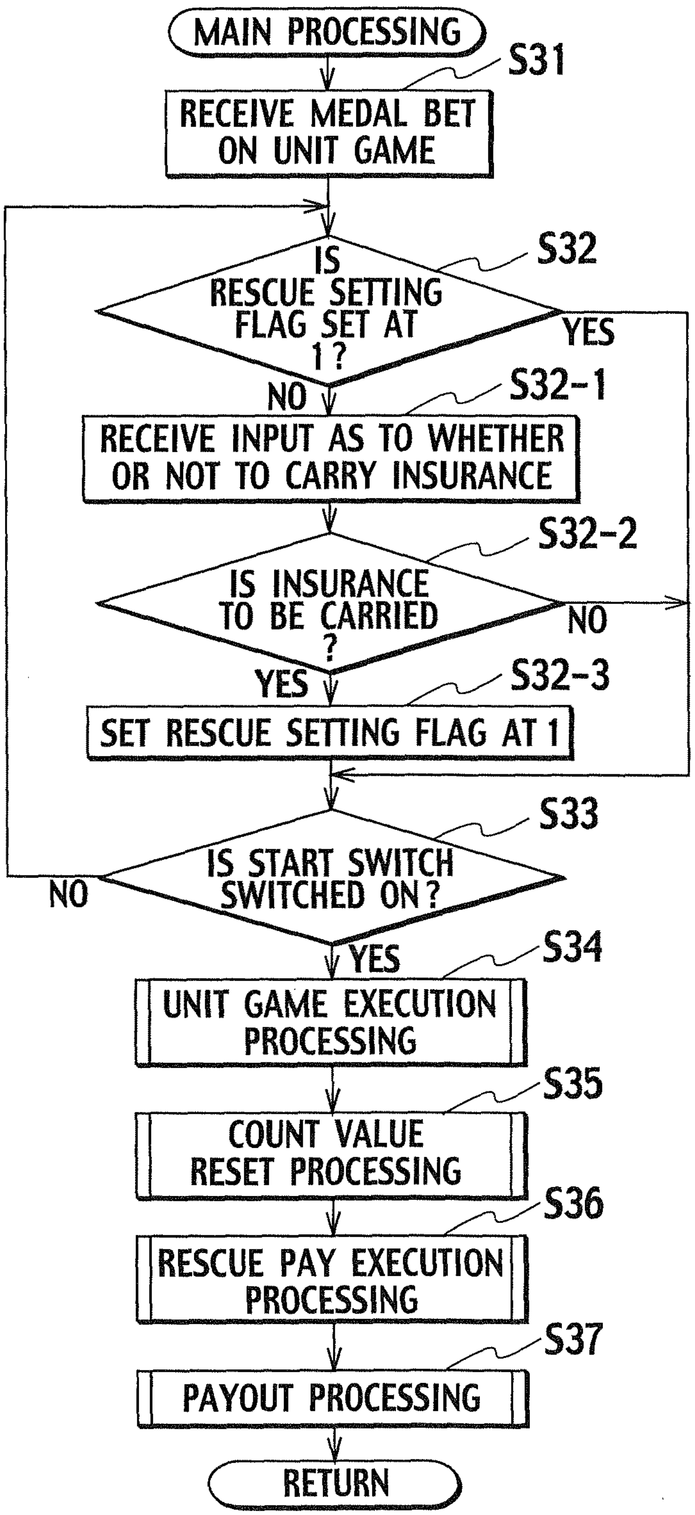
FIG. 4 is a flowchart showing a processing procedure of the slot machine according to the embodiment of the present invention.

In Step S145 to Step S148, the CPU 106 performs similar processing to those of Step S32-1 to Step S33 which are shown in FIG. 4. In Step S149, the CPU 106 performs the unit game execution processing shown in FIG. 14. In Step S150 to Step S152, the CPU 106 performs similar processing to those of Step S35 to Step S37 which are shown in FIG. 4.

Figure 14:
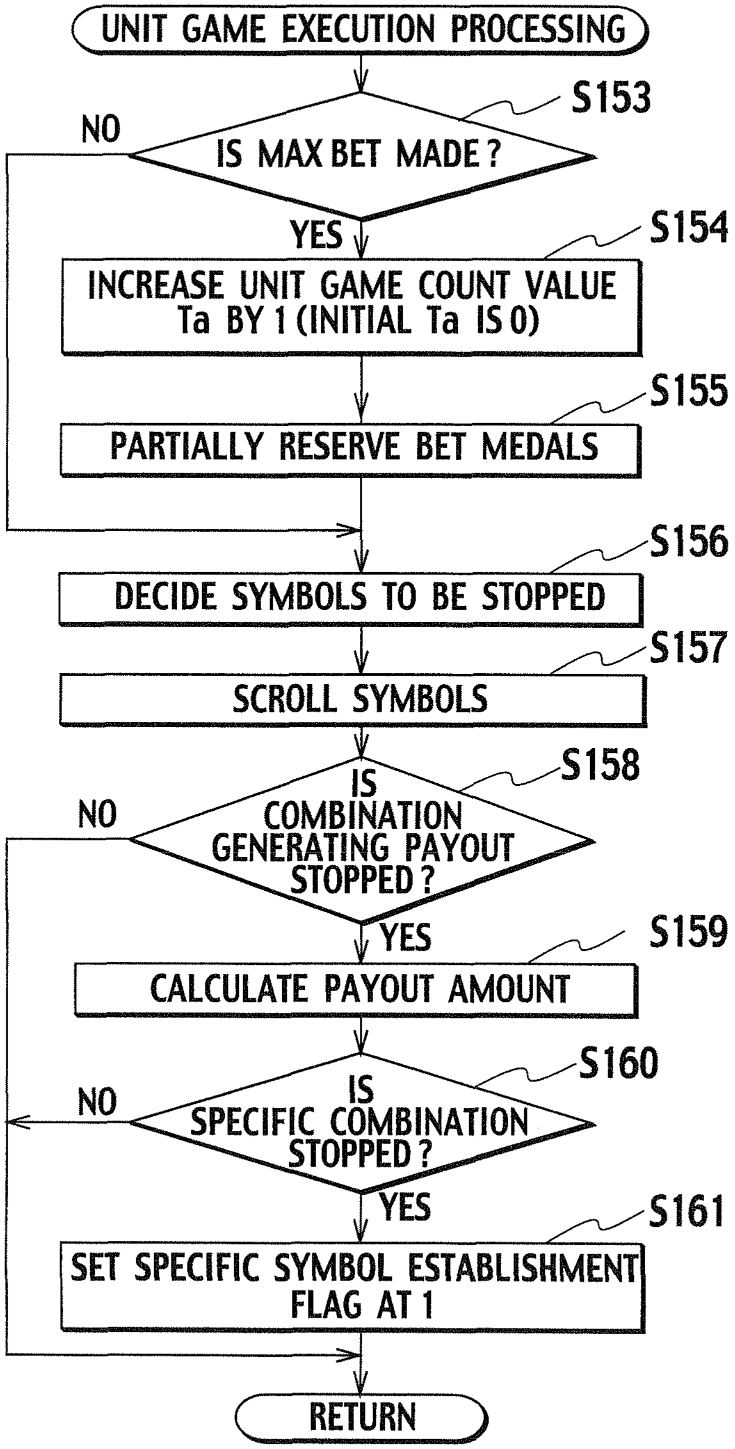
FIG. 14 is a flowchart showing a processing procedure of the slot machine according to the embodiment of the present invention.

Next, a description will be made of the unit game execution processing based on FIG. 14. In Step S153 to Step S161, the CPU 106 performs similar processing to those of Step S70-1 to Step S76 which are shown in FIG. 5. Specifically, even if the rescue setting flag is not turned on, the CPU 106 performs the processing for increasing the value Ta of the unit game counter, and the processing for partially reserving the bet medals.

(Fifth Embodiment)

Next, a description will be made of a fifth embodiment. The fifth embodiment is similar to the first embodiment except that main processing, unit game execution processing, count value reset processing, and rescue pay execution processing are different from those of the first embodiment. Moreover, count value reset processing and rescue pay execution processing of the fifth embodiment are similar to those of the second embodiment. Accordingly, a description will be made only of the main processing and the unit game execution processing.

Figure 15:
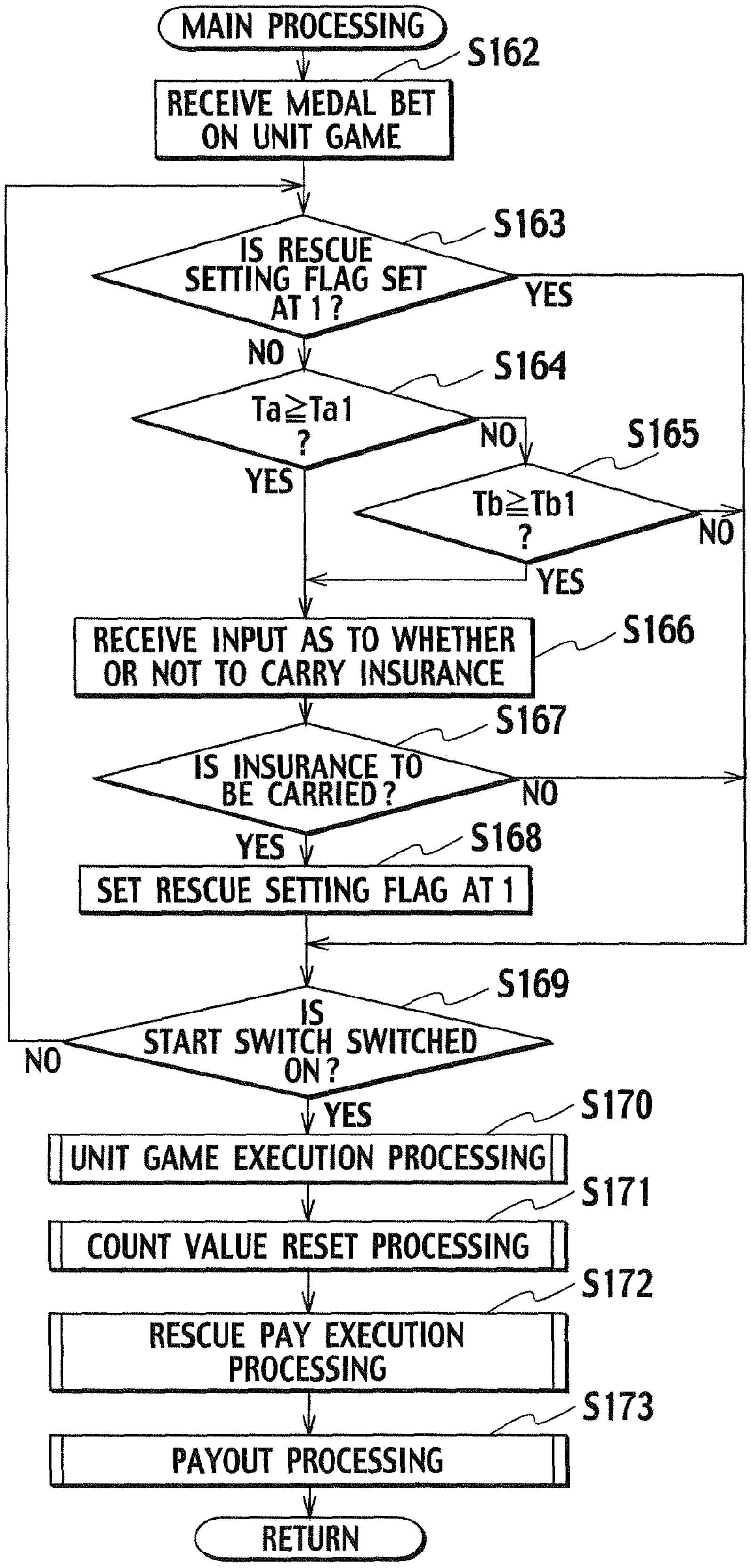
FIG. 15 is a flowchart showing a processing procedure of the slot machine according to the embodiment of the present invention.

First, a description will be made of the main processing based on FIG. 15. In Step S162, the CPU 106 performs similar processing to Step S31 shown in FIG. 4. In Step S163, the CPU 106 determines a condition that the rescue setting flag is turned on. When this condition is satisfied, the processing proceeds to Step S169, and when this condition is not satisfied, the processing proceeds to Step S164.

In Step S164, the CPU 106 determines a condition that the value Ta of the unit game counter is Ta1 or more. When this condition is satisfied, the processing proceeds to Step S166, and when this condition is not satisfied, the processing proceeds to Step S165.

In Step S165, the CPU 106 determines a condition that the value Tb of the accumulated bet counter becomes Tb1 or more. In this case, the value Tb1 is smaller than Tb max, and for example, becomes 500, and this value Tb1 is stored in the ROM 108. When this condition is satisfied, the processing proceeds to Step S166, and when this condition is not satisfied, the processing proceeds to Step S169.

In Step S166 to Step S169, the CPU 106 performs similar processing to those of Step S32-1 to Step S33 which are shown in FIG. 4. In Step S170, the CPU 106 performs the unit game execution processing shown in FIG. 16. In Step S171, the CPU 106 performs the count value reset processing shown in FIG. 10. In Step S172, the CPU 106 performs the rescue pay execution processing shown in FIG. 11. In Step S173, the CPU 106 performs similar processing to that of Step S37 shown in FIG. 4.

Figure 16:
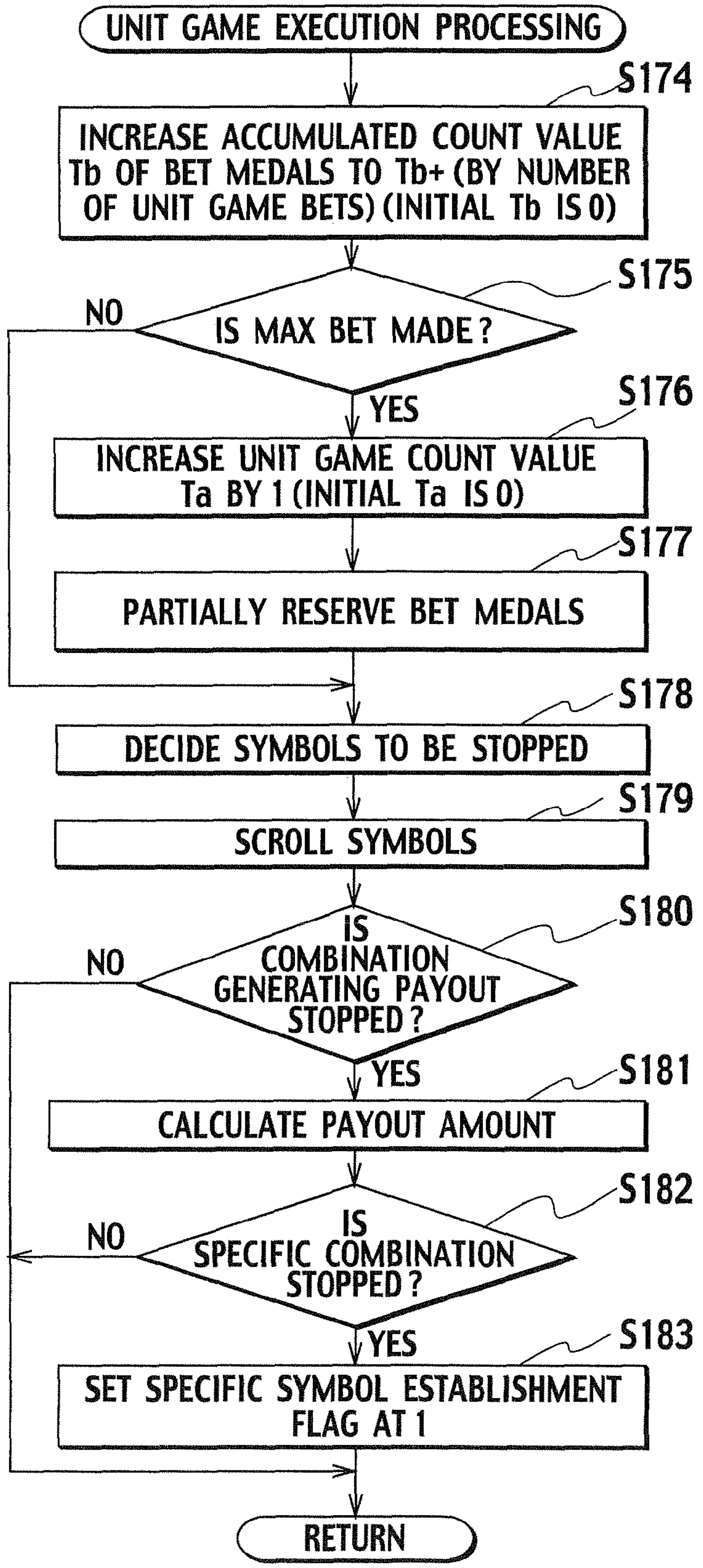
FIG. 16 is a flowchart showing a processing procedure of the slot machine according to the embodiment of the present invention.

Next, a description will be made of the unit game execution processing based on FIG. 16. In Step S174 to Step S183, the CPU 106 performs similar processing to those of Step S121 to Step S130 which are shown in FIG. 9. Specifically, even if the rescue setting flag is not turned on, the CPU 106 performs the processing for increasing the value Tb of the accumulated bet counter and the value Ta of the unit game counter, and the processing for partially reserving the bet medals.

The description has been made above of the embodiments of the present invention; however, the embodiments merely illustrate specific examples, and do not particularly limit the present invention. It is possible to appropriately perform design changes for specific configurations of the respective means and the like. Moreover, the effects described in the embodiments of the present invention merely list the most suitable effects generated from the present invention, and the effects derived from the present invention are not limited to those described in the embodiments of the present invention.

In the above-described detailed explanation, the description has been made mainly of the characteristic portions so that the present invention can be more easily understandable. The present invention is not limited to the embodiments described in the above-described detailed explanation, and can also be applied to other embodiments, and application ranges thereof are broad. Moreover, the terms and the phraseology which are used in this specification are used for explaining the present invention with accuracy, and are not used for limiting the interpretation of the present invention. Moreover, it is considered easy for those skilled in the art to figure out other configurations, systems, methods, and the like, which are incorporated in the concept of the present invention, from the concept of the present invention described in this specification. Hence, the description of claims must be regarded as one incorporating equilibrium configurations of those of the scope of the technical concept of the present invention without departing therefrom. Moreover, it is an object of the abstract to assist patent offices, common public institutions, engineers who belong to this technical field and are not conversant in patents, law terms, or technical terms, and the like so that they can rapidly determine the technical contents and essence of this application by a simple investigation. Hence, the abstract is not intended to limit the scope of the invention to be evaluated by the description of the scope of claims. Moreover, in order to sufficiently understand the object of the present invention and the effects intrinsic to the present invention, it is desired that the present invention be interpreted in full consideration for already-disclosed documents, and the like.

The above-described detailed explanation incorporates processing executed by a computer. The explanation and the expression in the above description are described for the purpose of being understood most efficiently by those skilled in the art. In this specification, the respective steps for use in deriving one result should be understood as processing free from self-contradiction. Moreover, in the respective steps, electric or magnetic signal transmission/reception, recording, and the like are performed. In the processing in each step, such a signal is expressed by a bit, a value, a symbol, a letter, a term, a number, or the like; however, it is necessary to keep it in mind that these are merely used for explanation convenience. Moreover, the processing in each step is sometimes described in expression common to a human action; however, the processing explained in this specification is basically executed by a variety of devices. Moreover, other configurations required for performing the respective steps become self-evident from the above-explanation.

What is claimed is:

1. A gaming machine, comprising:

a bet switch capable of making bets of a plurality of patterns in which bet amounts are different per unit game;

a display adapted to display a result of the game; and a controller configured to:

(a) repeatedly execute, through a betting process, the unit game that is started under a condition where the bet switch is operated to make one of the bets of the plurality of patterns, and is ended by displaying the result of the game on the display;

(b) store an execution number of maximum bet unit games in each of which a bet with a maximum bet amount among the bets of the plurality of patterns is made;

(c) when the bet with the maximum bet amount is made, reserve, as reserved bet, a part of the bet with the maximum bet amount;

(d) determine whether or not a playing result of the unit game has become a specific playing result;

(e) determine whether or not the stored execution number has reached a first predetermined number;

(f) when it is determined that the playing result of the unit game has become the specific playing result before the stored execution number reaches the first predetermined number, reset the reserved bet; and (g) when it is determined that the stored execution number has reached the first predetermined number, add a fixed amount of payout from the reserved bet to a bet memory, or provide a fixed amount of payout from the reserved bet, wherein the controller is configured to:

determine whether or not the stored execution number has reached a second predetermined number being smaller than the first predetermined number;

when it is determined that the stored execution number has reached the second predetermined number, receive an input as to whether or not to carry insurance;

when an input to carry insurance is received and when it is determined that the playing result of the unit game has not become the specific playing result and that the stored execution number has reached the first predetermined number, add a fixed amount of payout from the reserved bet to a bet memory, or provide a fixed amount of payout from the reserved bet; and do not receive the input as to whether or not to carry insurance unless the stored execution number has reached the second predetermined number.

2. The gaming machine according to claim 1, wherein the controller is configured to:

store an accumulated bet amount bet in unit games;

when it is determined that the stored execution number has not reached the second predetermined number, determine whether or not the stored accumulated bet amount has reached a predetermined bet amount;

when it is determined that the stored accumulated bet amount has reached the predetermined bet amount, receive an input as to whether or not to carry insurance.

3. A gaming machine, comprising:

a bet switch capable of making bets of a plurality of patterns in which bet amounts are different per unit game;

a display adapted to display a result of the game;

a payout port through which payout is provided; and a controller configured to:

(a) repeatedly execute, through a betting process, the unit game that is started under a condition where the bet switch is operated to make one of the bets of the plurality of patterns, and is ended by displaying the result of the game on the display;

(b) store an execution number of maximum bet unit games in each of which a bet with a maximum bet amount among the bets of the plurality of patterns is made;

(c) when the bet with the maximum bet amount is made, reserve, as reserved bet, a part of the bet with the maximum bet amount;

(d) determine whether or not a playing result of the unit game has become a specific playing result;

(e) determine whether or not the stored execution number has reached a first predetermined number;

(f) when it is determined that the playing result of the unit game has become the specific playing result before the stored execution number reaches the first predetermined number, reset the reserved bet; and (g) when it is determined that the stored execution number has reached the first predetermined number, provide a fixed amount of payout from the reserved bet through the payout port, wherein the controller is configured to:

determine whether or not the stored execution number has reached a second predetermined number being smaller than the first predetermined number;

when it is determined that the stored execution number has reached the second predetermined number, receive an input as to whether or not to carry insurance;

when an input to carry insurance is received and when it is determined that the playing result of the unit game has not become the specific playing result and that the stored execution number has reached the first predetermined number, add a fixed amount of payout from the reserved bet to a bet memory, or provide a fixed amount of payout from the reserved bet; and do not receive the input as to whether or not to carry insurance unless the stored execution number has reached the second predetermined number.

4. A gaming machine, comprising:

a bet switch capable of making bets of a plurality of patterns in which bet amounts are different per unit game;

a display adapted to arrange and rearrange a plurality of symbols; and a controller configured to:

(a) repeatedly execute, through a betting process, the unit game that is started under a condition where the switch is operated to make one of the bets of the plurality of patterns, and is ended by rearranging the plurality of symbols arranged on the display;

(b) store an execution number of maximum bet unit games in each of which a bet with a maximum bet amount among the bets of the plurality of patterns is made;

(c) when the bet with the maximum bet amount is made, reserve, as reserved bet, a part of the bet with the maximum bet amount;

(d) determine whether or not a playing result of the unit game has become a specific playing result;

(e) determine whether or not the stored execution number has reached a first predetermined number;

(f) when it is determined that the playing result of the unit game has become the specific playing result before the stored execution number reaches the first predetermined number, reset the reserved bet; and (g) when it is determined that the stored execution number has reached the first predetermined number, add a fixed amount of payout from the reserved bet to a bet memory, or provide a fixed amount of payout from the reserved bet, wherein the controller is configured to:

determine whether or not the stored execution number has reached a second predetermined number being smaller than the first predetermined number;

when it is determined that the stored execution number has reached the second predetermined number, receive an input as to whether or not to carry insurance;

when an input to carry insurance is received and when it is determined that the playing result of the unit game has not become the specific playing result and that the stored execution number has reached the first predetermined number, add a fixed amount of payout from the reserved bet to a bet memory, or provide a fixed amount of payout from the reserved bet; and do not receive the input as to whether or not to carry insurance unless the stored execution number has reached the second predetermined number.

5. A gaming machine, comprising:

a bet switch capable of making bets of a plurality of patterns in which bet amounts are different per unit game;

a display adapted to arrange and rearrange a plurality of symbols;

a payout port through which payout is provided; and a controller configured to:

(a) repeatedly execute, through a betting process, the unit game that is started under a condition where the switch is operated to make one of the bets of the plurality of patterns, and is ended by rearranging the plurality of symbols arranged on the display;

(b) store an execution number of maximum bet unit games in each of which a bet with a maximum bet amount among the bets of the plurality of patterns is made;

(c) when the bet with the maximum bet amount is made, reserve, as reserved bet, a part of the bet with the maximum bet amount;

(d) determine whether or not a playing result of the unit game has become a specific playing result;

(e) determine whether or not the stored execution number has reached a first predetermined number;

(f) when it is determined that the playing result of the unit game has become the specific playing result before the stored execution number reaches the first predetermined number, reset the reserved bet; and (g) when it is determined that the stored execution number has reached the first predetermined number, provide a fixed amount of payout from the reserved bet through the payout port, wherein the controller is configured to:

determine whether or not the stored execution number has reached a second predetermined number being smaller than the first predetermined number;

when it is determined that the stored execution number has reached the second predetermined number, receive an input as to whether or not to carry insurance;

when an input to carry insurance is received and when it is determined that the playing result of the unit game has not become the specific playing result and that the stored execution number has reached the first predetermined number, add a fixed amount of payout from the reserved bet to a bet memory, or provide a fixed amount of payout from the reserved bet; and do not receive the input as to whether or not to carry insurance unless the stored execution number has reached the second predetermined number.

6. A control method of a gaming machine having a processor, comprising:

via the processor, repeatedly executing a unit game that is started under a condition where a bet switch capable of making bets of a plurality of patterns in which bet amounts are different per unit game is operated to make one of the bets of the plurality of patterns, and is ended by displaying a result of the game on the display, through a betting process;

via the processor, storing an execution number of maximum bet unit games in each of which a bet with a maximum bet amount among the bets of the plurality of patterns is made;

when the bet with the maximum bet amount is made, reserving via the processor, as reserved bet, a part of the bet with the maximum bet amount;

via the processor, determining whether or not a playing result of the unit game has become a specific playing result;

via the processor, determining whether or not the stored execution number has reached a predetermined number;

when it is determined that the playing result of the unit game has become the specific playing result before the stored execution number reaches the predetermined number, via the processor, resetting the reserved bet; and when it is determined that the stored execution number has reached the predetermined number, via the processor, adding a fixed amount of payout among the reserved bet to a bet memory, or providing a fixed amount of payout;

via the processor, determining whether or not the stored execution number has reached a second predetermined number being smaller than the predetermined number;

when it is determined that the stored execution number has reached the second predetermined number, via the processor, receiving an input as to whether or not to carry insurance;

when an input to carry insurance is received and when it is determined that the playing result of the unit game has not become the specific playing result and that the stored execution number has reached the first predetermined number, via the processor, adding a fixed amount of payout from the reserved bet to a bet memory, or providing a fixed amount of payout from the reserved bet; and not receiving the input as to whether or not to carry insurance unless the stored execution number has reached the second predetermined number.

7. The control method according to claim 6, further comprising:

via the processor, storing an accumulated bet amount bet in unit games;

when it is determined that the stored execution number has not reached the second predetermined number, via the processor, determining whether or not the stored accumulated bet amount has reached a predetermined bet amount;

when it is determined that the stored accumulated bet amount has reached the predetermined bet amount, via the processor, receiving an input as to whether or not to carry insurance.

8. A control method of a gaming machine having a processor, comprising:

via the processor, repeatedly executing a unit game that is started under a condition where a bet switch capable of making bets of a plurality of patterns in which bet amounts are different per unit game, is operated to make one of the bets of the plurality of patterns, and is ended by displaying a result of the game on the display, through a betting process;

via the processor, storing an execution number of maximum bet unit games in each of which a bet with a maximum bet amount among the bets of the plurality of patterns is made;

when the bet with the maximum bet amount is made, reserving via the processor, as reserved bet, a part of the bet with the maximum bet amount;

via the processor, determining whether or not a playing result of the unit game has become a specific playing result;

via the processor, determining whether or not the stored execution number has reached a first predetermined number;

when it is determined that the playing result of the unit game has become the specific playing result before the stored execution number reaches the first predetermined number, via the processor, resetting the reserved bet;

when it is determined that the stored execution number has reached the first predetermined number, via the processor, providing a fixed amount of payout from the reserved bet through a payout port;

via the processor, determining whether or not the stored execution number has reached a second predetermined number being smaller than the predetermined number;

when it is determined that the stored execution number has reached the second predetermined number, via the processor, receiving an input as to whether or not to carry insurance;

when an input to carry insurance is received and when it is determined that the playing result of the unit game has not become the specific playing result and that the stored execution number has reached the first predetermined number, via the processor, adding a fixed amount of payout from the reserved bet to a bet memory, or providing a fixed amount of payout from the reserved bet; and not receiving the input as to whether or not to carry insurance unless the stored execution number has reached the second predetermined number.

9. A control method of a gaming machine having a processor, comprising:

via the processor, repeatedly executing a unit game that is started under a condition where a bet switch capable of making bets of a plurality of patterns in which bet amounts are different per unit game is operated to make one of the bets of the plurality of patterns, and is ended by rearranging a plurality of symbols arranged on a display, through a betting process;

via the processor, storing an execution number of maximum bet unit games in each of which a bet with a maximum bet amount among the bets of the plurality of patterns is made;

when the bet with the maximum bet amount is made, reserving via the processor, as reserved bet, a part of the bet with the maximum bet amount;

via the processor, determining whether or not a playing result of the unit game has become a specific playing result;

via the processor, determining whether or not the stored execution number has reached a first predetermined number;

when it is determined that the playing result of the unit game has become the specific playing result before the stored execution number reaches the first predetermined number, via the processor, resetting the reserved bet;

when it is determined that the stored execution number has reached the first predetermined number, via the processor, adding a fixed amount of payout from the reserved bet to a bet memory, or providing a fixed amount of payout;

via the processor, determining whether or not the stored execution number has reached a second predetermined number being smaller than the predetermined number;

when it is determined that the stored execution number has reached the second predetermined number, via the processor, receiving an input as to whether or not to carry insurance;

when an input to carry insurance is received and when it is determined that the playing result of the unit game has not become the specific playing result and that the stored execution number has reached the first predetermined number, via the processor, adding a fixed amount of payout from the reserved bet to a bet memory, or providing a fixed amount of payout from the reserved bet; and not receiving the input as to whether or not to carry insurance unless the stored execution number has reached the second predetermined number.

10. A control method of a gaming machine having a processor, comprising:

via the processor, repeatedly executing a unit game that is started under a condition where a bet switch capable of making bets of a plurality of patterns in which bet amounts are different per unit game is operated to make one of the bets of the plurality of patterns, and is ended by rearranging a plurality of symbols arranged on a display, through a betting process;

via the processor, storing an execution number of maximum bet unit games in each of which a bet with a maximum bet amount among the bets of the plurality of patterns is made;

when the bet with the maximum bet amount is made, reserving via the processor, as reserved bet, a part of the bet with the maximum bet amount;

via the processor, determining whether or not a playing result of the unit game has become a specific playing result;

via the processor, determining whether or not the stored execution number has reached a first predetermined number;

when it is determined that the playing result of the unit game has become the specific playing result before the stored execution number reaches the first predetermined number, via the processor, resetting the reserved bet; and when it is determined that the stored execution number has reached the first predetermined number, via the processor, providing a fixed amount of payout from the reserved bet through a payout port;

via the processor, determining whether or not the stored execution number has reached a second predetermined number being smaller than the predetermined number;

when it is determined that the stored execution number has reached the second predetermined number, via the processor, receiving an input as to whether or not to carry insurance;

when an input to carry insurance is received and when it is determined that the playing result of the unit game has not become the specific playing result and that the stored execution number has reached the first predetermined number, via the processor, adding a fixed amount of payout from the reserved bet to a bet memory, or providing a fixed amount of payout from the reserved bet; and not receiving the input as to whether or not to carry insurance unless the stored execution number has reached the second predetermined number.

* * * * *